US011503663B2

(12) United States Patent
Zheng et al.

(10) Patent No.: US 11,503,663 B2
(45) Date of Patent: Nov. 15, 2022

(54) LOSS-LESS TRANSMISSION FOR UNACKNOWLEDGED MODE (UM) DATA RADIO BEARER (DRB)

(71) Applicant: QUALCOMM Incorporated, San Diego, CA (US)

(72) Inventors: Ruiming Zheng, Beijing (CN); Xipeng Zhu, San Diego, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 16/920,199

(22) Filed: Jul. 2, 2020

(65) Prior Publication Data

US 2021/0014924 A1 Jan. 14, 2021

(30) Foreign Application Priority Data

Jul. 8, 2019 (WO) ................ PCT/CN2019/094974

(51) Int. Cl.
*H04W 76/20* (2018.01)
*H04W 76/19* (2018.01)
*H04L 47/34* (2022.01)

(52) U.S. Cl.
CPC ............. *H04W 76/20* (2018.02); *H04L 47/34* (2013.01); *H04W 76/19* (2018.02)

(58) Field of Classification Search
None
See application file for complete search history.

(56) References Cited

U.S. PATENT DOCUMENTS

| | | | |
|---|---|---|---|
| 2014/0254393 A1* | 9/2014 | Yi | ............ H04W 72/0413 370/242 |
| 2016/0212661 A1 | 7/2016 | Basu Mallick et al. | |
| 2021/0258109 A1* | 8/2021 | Cho | ............ H04L 1/1896 |

FOREIGN PATENT DOCUMENTS

| | | |
|---|---|---|
| CN | 102056226 A | 5/2011 |
| CN | 109039548 A * | 12/2018 |
| WO | 2009018318 A2 | 2/2009 |

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification" (Release 8), 3GPP TS 36.323 V8.6.0 (Jun. 2009), 24 Pages.

(Continued)

*Primary Examiner* — Kouroush Mohebbi
(74) *Attorney, Agent, or Firm* — Muncy, Geissler, Olds & Lowe, P.C.

(57) ABSTRACT

Disclosed are techniques for wireless communication. In an aspect, a packet data convergence protocol (PDCP) entity of a receiver device receives, from a radio link control (RLC) entity of the receiver device, a plurality of RLC data packets received from a transmitter device over an RLC unacknowledged mode (UM) data radio bearer (DRB) or RLC transparent mode (TM) DRB. The PDCP entity generates a plurality of PDCP data packets corresponding to the plurality of RLC data packets. The receiver device determines to send a PDCP status report indicating a reception status at the receiver device of the plurality of PDCP data packets and transmits the PDCP status report to a PDCP entity of the transmitter device. The receiver device receives, in response to sending the PDCP status report, one or more PDCP data packets of the plurality of PDCP data packets that were not successfully received at the receiver device.

56 Claims, 16 Drawing Sheets

(56) References Cited

OTHER PUBLICATIONS

International Search Report and Written Opinion—PCT/CN2019/094974—ISA/EPO—dated Apr. 8, 2020.

* cited by examiner

User Plane Protocol Stack

Control Plane Protocol Stack

Data PDU for DRBs with 12-bit PDCP SN

Data PDU for DRBs with 18-bit PDCP SN

LOSS-LESS TRANSMISSION FOR UNACKNOWLEDGED MODE (UM) DATA RADIO BEARER (DRB)

CROSS-REFERENCE TO RELATED APPLICATIONS

The present application for patent claims priority under 35 U.S.C. § 119 to International Application No. PCT/CN2019/094974, entitled "LOSS-LESS TRANSMISSION FOR UNACKNOWLEDGED MODE (UM) DATA RADIO BEARER (DRB)," filed Jul. 8, 2019, assigned to the assignee hereof, and expressly incorporated herein by reference in its entirety.

INTRODUCTION

Aspects of this disclosure relate generally to wireless communications and the like.

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) wireless standard enables higher data transfer speeds, greater numbers of connections, and better coverage, among other improvements. The 5G standard (also referred to as New Radio (NR)), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for wireless communication performed by a receiver device includes receiving, at a packet data convergence protocol (PDCP) entity of the receiver device from a radio link control (RLC) entity of the receiver device, a plurality of RLC data packets, the plurality of RLC data packets received from a transmitter device over an RLC unacknowledged mode (UM) data radio bearer (DRB) or an RLC transparent mode (TM) DRB, generating, by the PDCP entity, a plurality of PDCP data packets corresponding to the plurality of RLC data packets, transmitting, to a PDCP entity of the transmitter device, a PDCP status report indicating a reception status at the receiver device of the plurality of PDCP data packets, and receiving, from the transmitter device, in response to sending the PDCP status report, one or more PDCP data packets of the plurality of PDCP data packets that were not successfully received at the receiver device.

In an aspect, a method for wireless communication performed by a transmitter device includes generating, by an RLC entity of the transmitter device, a plurality of RLC data packets corresponding to a plurality of PDCP data packets received from a PDCP entity of the transmitter device, transmitting, to a receiver device, over an RLC UM DRB or an RLC TM DRB, the plurality of RLC data packets, receiving, from the receiver device, a PDCP status report indicating a reception status at the receiver device of the plurality of PDCP data packets, and transmitting, to the receiver device, based on the PDCP status report, one or more PDCP data packets of the plurality of PDCP data packets that were not successfully received at the receiver device.

In an aspect, a receiver device includes a memory, at least one transceiver, and at least one processor communicatively coupled to the memory and the at least one transceiver, the at least one processor configured to: receive, at a PDCP entity of the receiver device from a RLC entity of the receiver device, a plurality of RLC data packets, the plurality of RLC data packets received from a transmitter device over an RLC UM DRB or an RLC TM DRB, generate, by the PDCP entity, a plurality of PDCP data packets corresponding to the plurality of RLC data packets, cause the at least one transceiver to transmit, to a PDCP entity of the transmitter device, a PDCP status report indicating a reception status at the receiver device of the plurality of PDCP data packets, and receive, from the transmitter device via the at least one transceiver, in response to sending the PDCP status report, one or more PDCP data packets of the plurality of PDCP data packets that were not successfully received at the receiver device.

In an aspect, a transmitter device includes a memory, at least one transceiver, and at least one processor communicatively coupled to the memory and the at least one transceiver, the at least one processor configured to: generate, by an RLC entity of the transmitter device, a plurality of RLC data packets corresponding to a plurality of PDCP data packets received from a PDCP entity of the transmitter device, cause a transmitter of the transmitter device to transmit, to a receiver device, over an RLC UM DRB or an RLC TM DRB, the plurality of RLC data packets, receive, from the receiver device, a PDCP status report indicating a reception status at the receiver device of the plurality of PDCP data packets, and cause the transmitter to transmit, to the receiver device, based on the PDCP status report, one or more PDCP data packets of the plurality of PDCP data packets that were not successfully received at the receiver device.

In an aspect, a non-transitory computer-readable medium storing computer-executable instructions includes computer-executable instructions comprising at least one instruction instructing a receiver device to receive, at a PDCP entity of the receiver device from an RLC entity of the receiver device, a plurality of RLC data packets, the plurality of RLC data packets received from a transmitter device over an RLC UM DRB or an RLC TM DRB, at least one instruction instructing the receiver device to generate, by the PDCP entity, a plurality of PDCP data packets corresponding to the plurality of RLC data packets, at least one instruction instructing the receiver device to transmit, to a PDCP entity of the transmitter device, a PDCP status report indicating a reception status at the receiver device of the plurality of PDCP data packets, and at least one instruction instructing the receiver device to receive, from the transmitter device, in response to sending the PDCP status report, one or more PDCP data packets of the plurality of PDCP data packets that were not successfully received at the receiver device.

In an aspect, a non-transitory computer-readable medium storing computer-executable instructions includes computer-executable instructions comprising at least one instruction instructing a transmitter device to generate, by an RLC entity of the transmitter device, a plurality of RLC data packets corresponding to a plurality of PDCP data packets received from a PDCP entity of the transmitter device, at least one instruction instructing the transmitter device to transmit, to a receiver device, over an RLC UM DRB or an RLC TM DRB, the plurality of RLC data packets, at least one instruction instructing the transmitter device to receive, from the receiver device, a PDCP status report indicating a reception status at the receiver device of the plurality of PDCP data packets, and at least one instruction instructing the transmitter device to transmit, to the receiver device, based on the PDCP status report, one or more PDCP data packets of the plurality of PDCP data packets that were not successfully received at the receiver device.

In an aspect, a receiver device includes means for receiving, at a PDCP entity of the receiver device from an RLC entity of the receiver device, a plurality of RLC data packets, the plurality of RLC data packets received from a transmitter device over an RLC UM DRB or an RLC TM DRB, means for generating, by the PDCP entity, a plurality of PDCP data packets corresponding to the plurality of RLC data packets, means for transmitting, to a PDCP entity of the transmitter device, a PDCP status report indicating a reception status at the receiver device of the plurality of PDCP data packets, and means for receiving, from the transmitter device, in response to sending the PDCP status report, one or more PDCP data packets of the plurality of PDCP data packets that were not successfully received at the receiver device.

In an aspect, a transmitter device includes means for generating, by an RLC entity of the transmitter device, a plurality of RLC data packets corresponding to a plurality of PDCP data packets received from a PDCP entity of the transmitter device, means for transmitting, to a receiver device, over an RLC UM DRB or an RLC TM DRB, the plurality of RLC data packets, means for receiving, from the receiver device, a PDCP status report indicating a reception status at the receiver device of the plurality of PDCP data packets, and means for transmitting, to the receiver device, based on the PDCP status report, one or more PDCP data packets of the plurality of PDCP data packets that were not successfully received at the receiver device.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
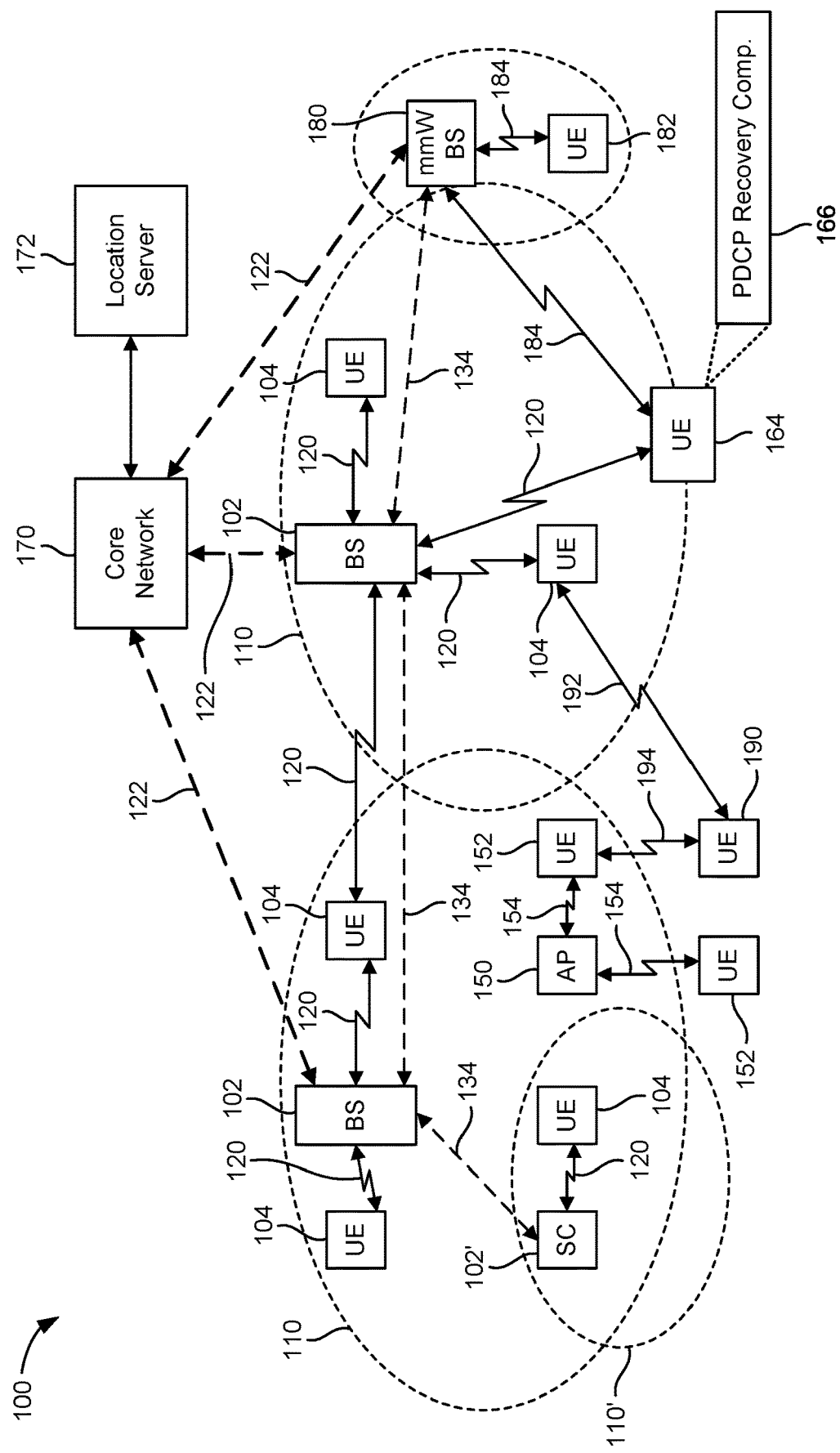
FIG. 1 illustrates an exemplary wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a PDCP recovery component 166 that may enable the UE 164 to perform the UE operations described herein. Note that although only one UE in FIG. 1 is illustrated as having a PDCP recovery component, any of the UEs in FIG. 1 may be configured to perform the UE operations described herein.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
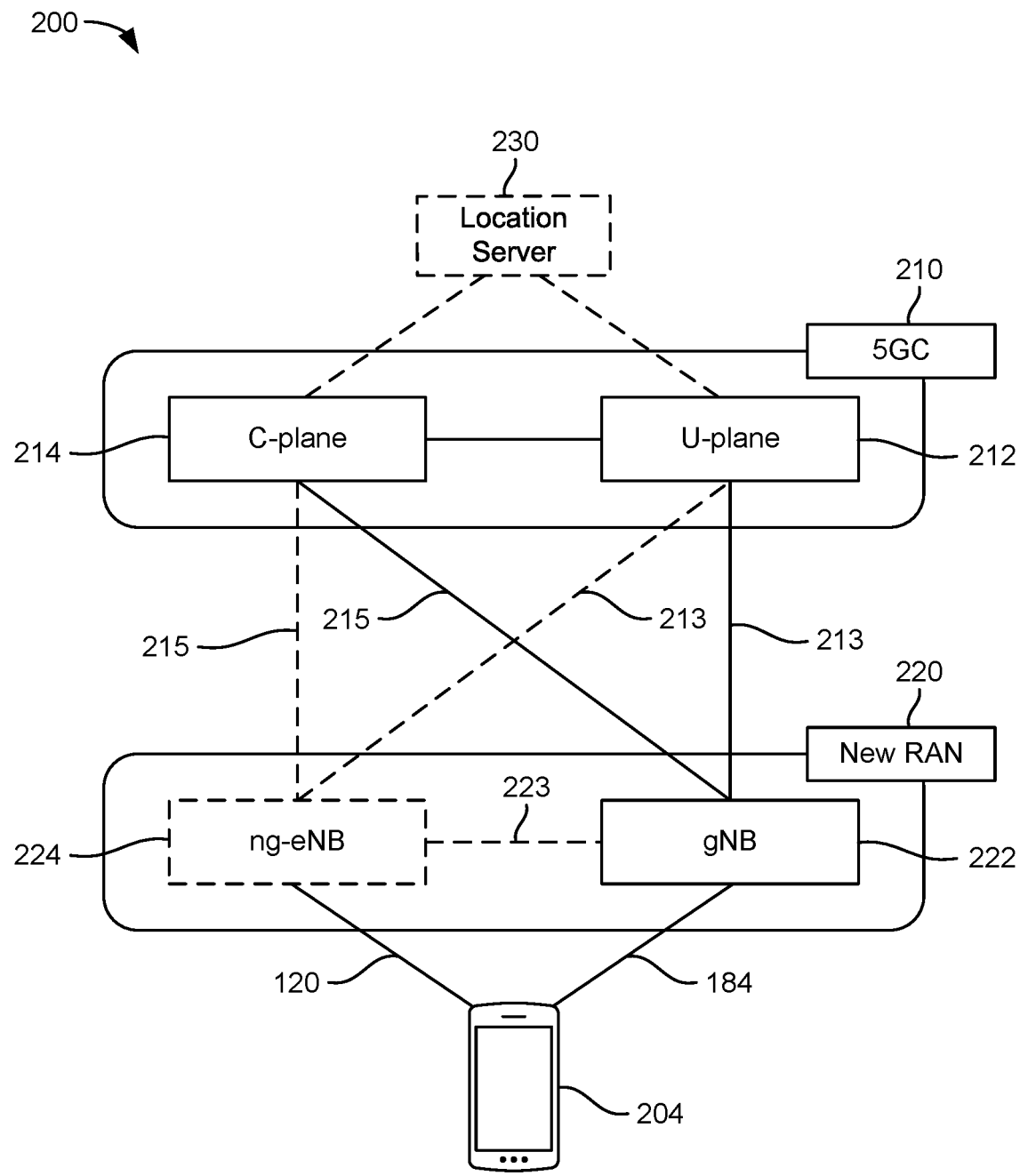
FIGS. 2A and 2B illustrate example wireless network structures, according to aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
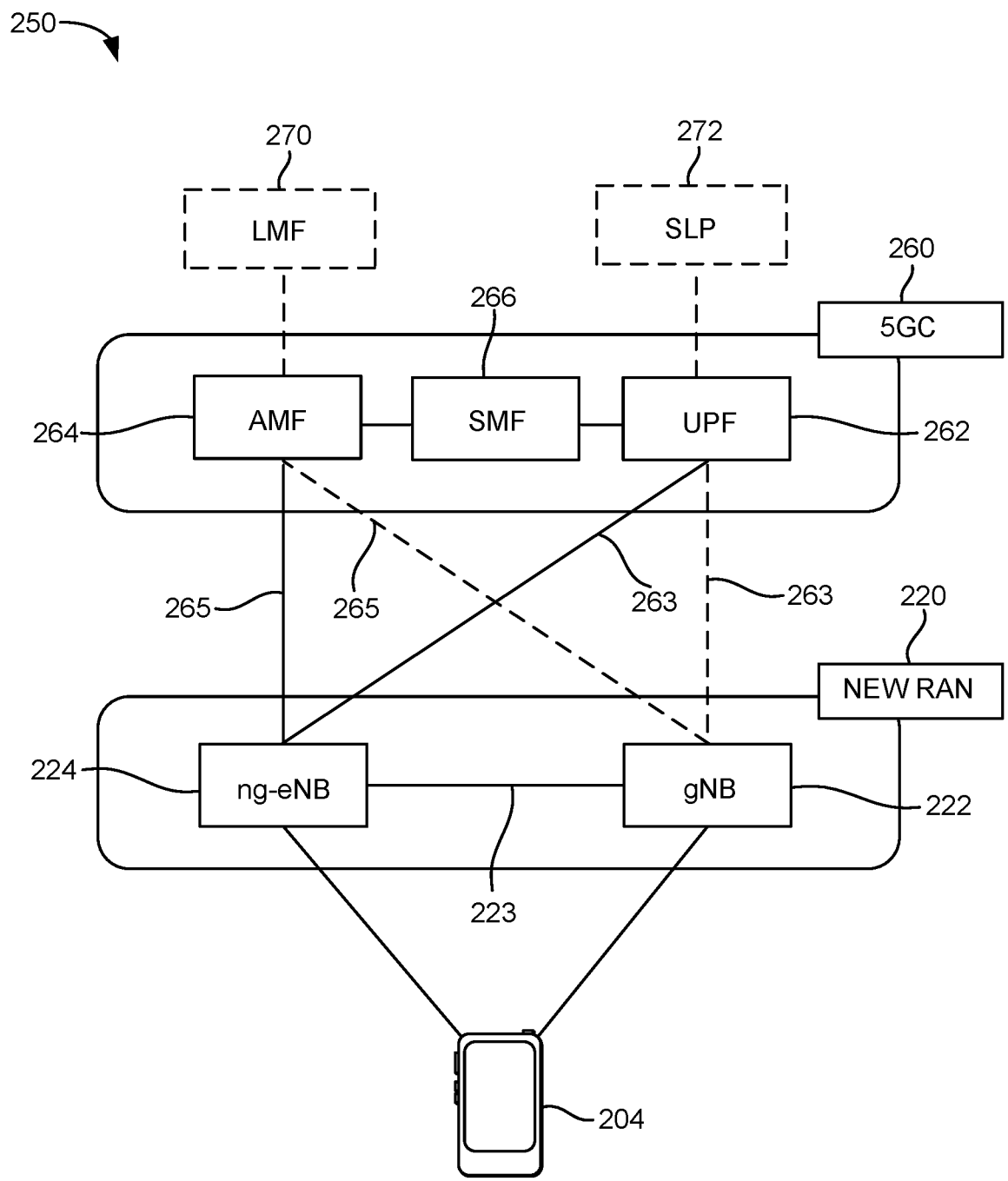

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
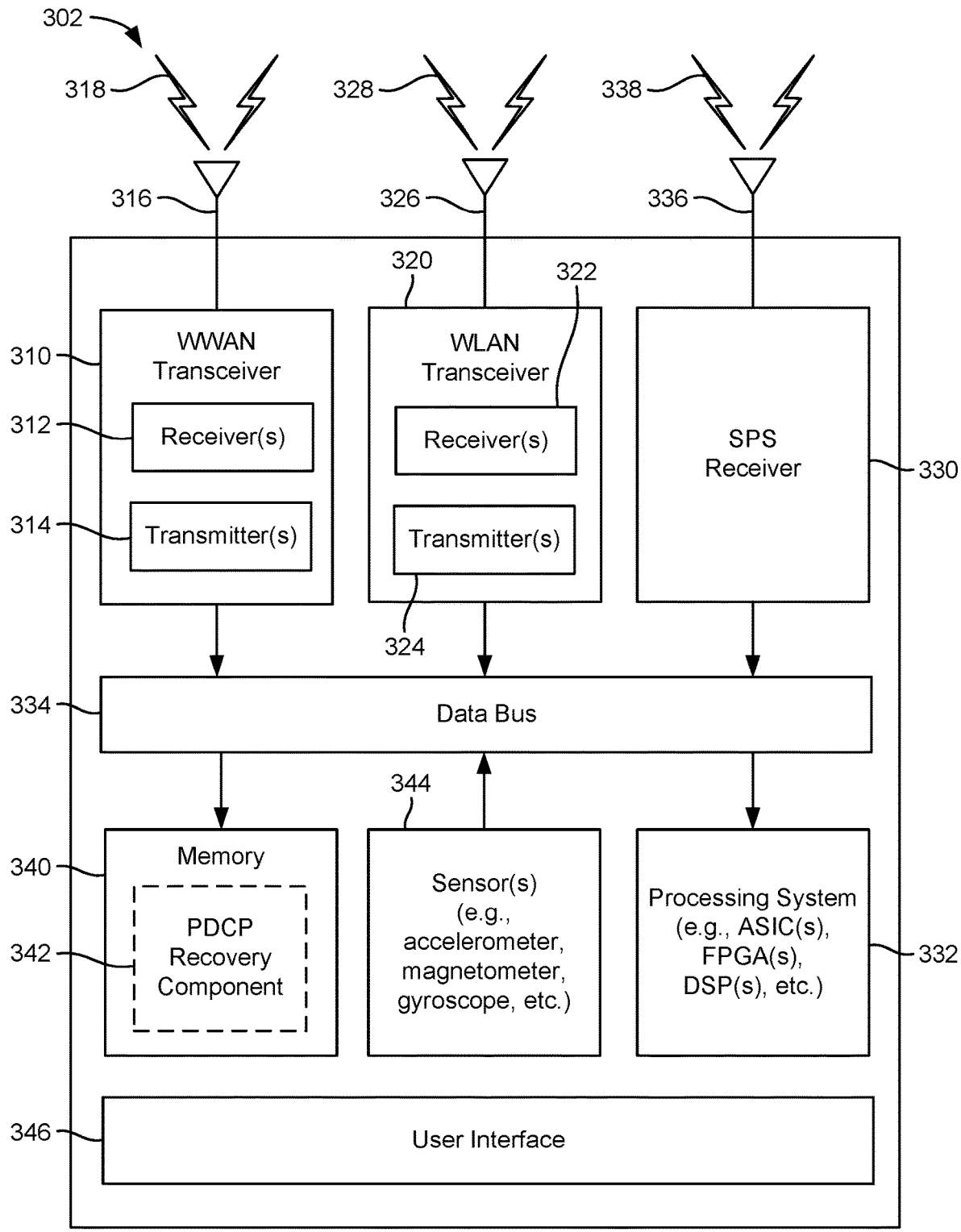
FIGS. 3A to 3C are simplified block diagrams of several sample aspects of components that may be employed in wireless communication nodes and configured to support communication as taught herein.
Figure 3B:
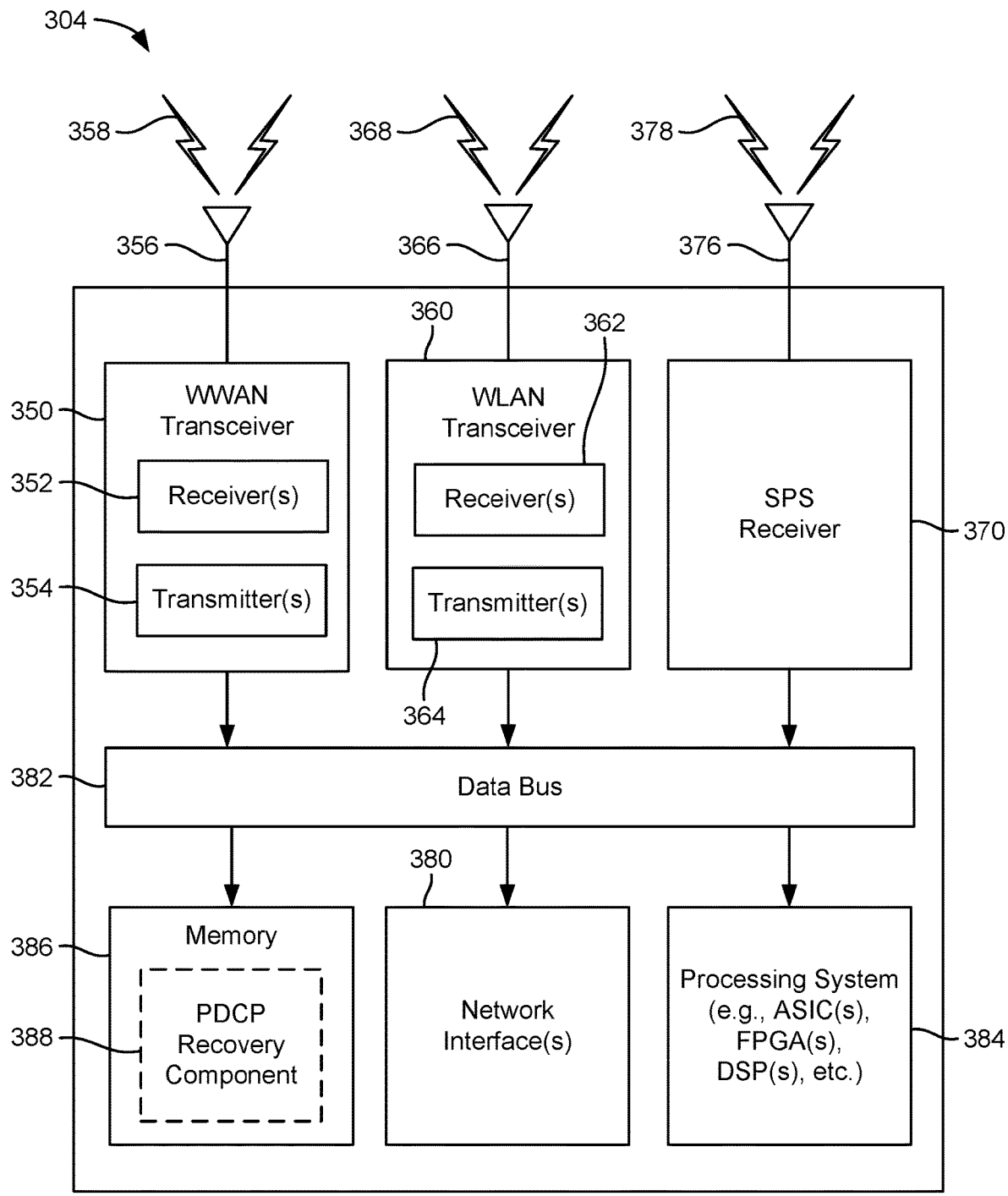
Figure 3C:
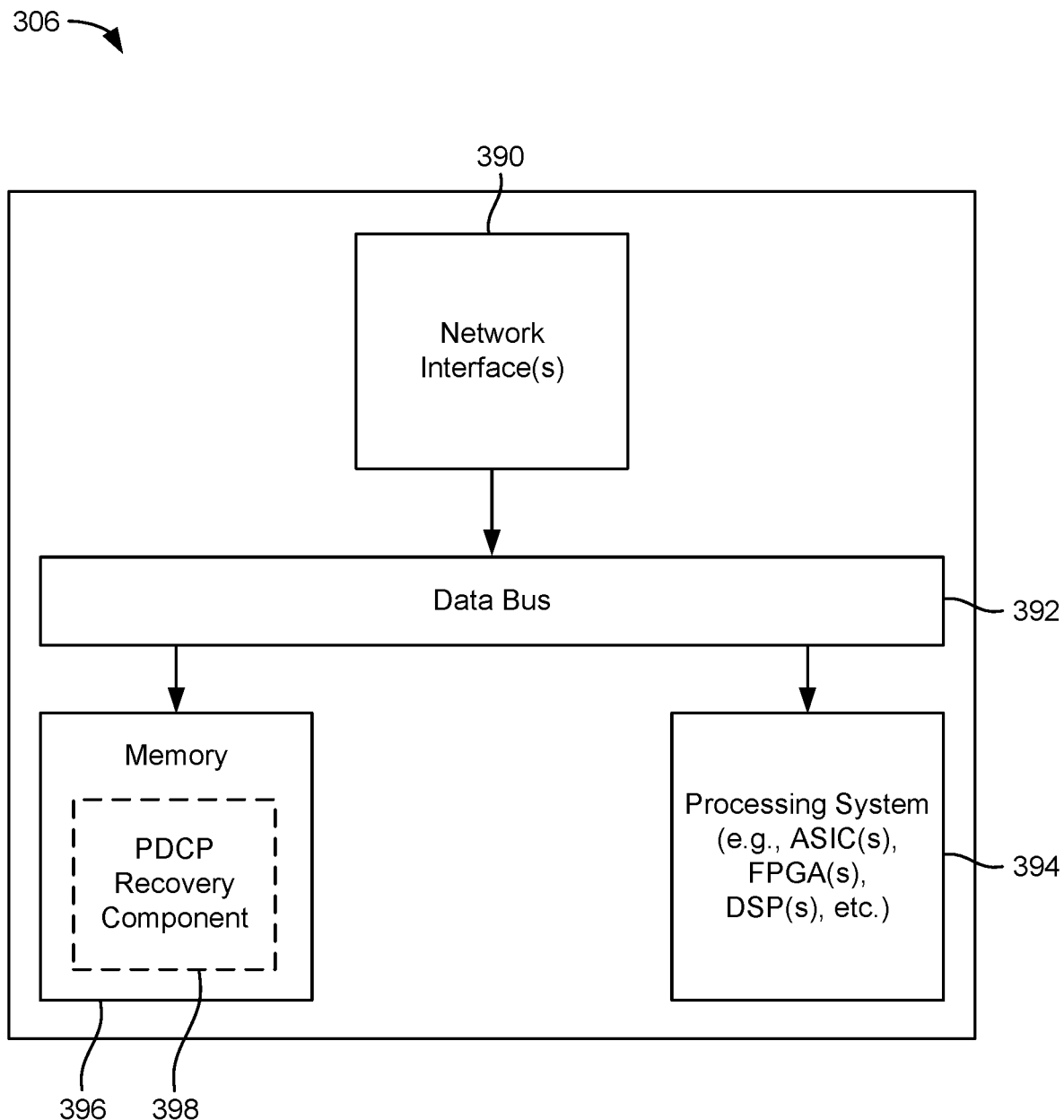

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, packet data convergence protocol (PDCP) recovery, and for providing other processing functionality. The base station 304 includes a processing system 384 for providing functionality relating to, for example, PDCP recovery as disclosed herein, and for providing other processing functionality. The network entity 306 includes a processing system 394 for providing functionality relating to, for example, PDCP recovery as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include PDCP recovery components 342, 388, and 398, respectively. The PDCP recovery components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the PDCP recovery components 342, 388, and 398 may be external to the processing systems 332, 384, and 394 (e.g., part of a modem processing system, integrated with another processing system, etc.). Alternatively, the PDCP recovery components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a PDCP layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the PDCP recovery components 342, 388, and 398, etc.

Figure 4A:
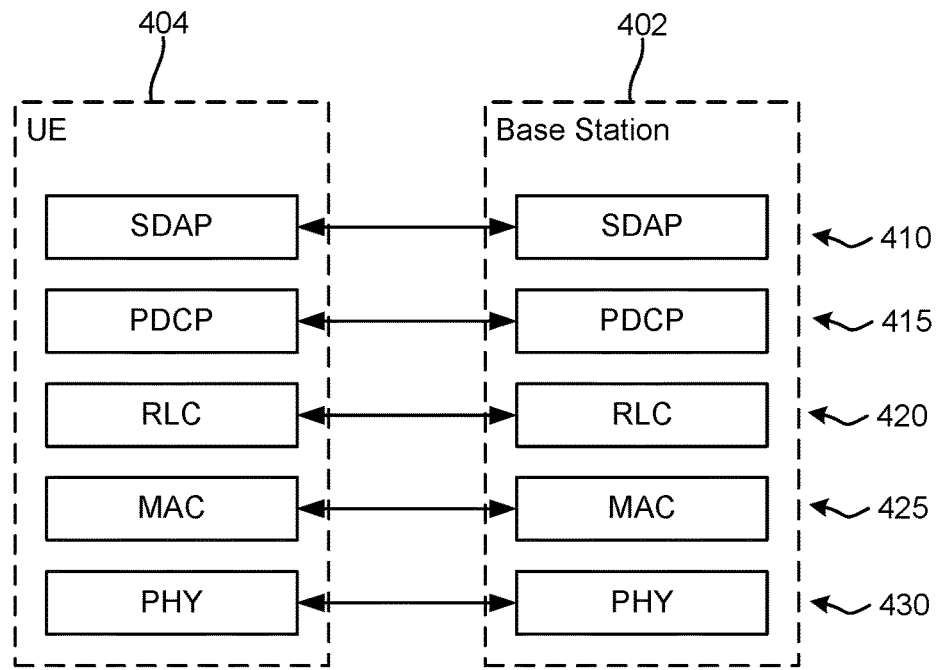
FIGS. 4A and 4B illustrate user plane and control plane protocol stacks, according to aspects of the disclosure.

FIG. 4A illustrates a user plane protocol stack, according to aspects of the disclosure. As illustrated in FIG. 4A, a UE 404 and a base station 402 (which may correspond to any of the UEs and base stations, respectively, described herein) implement, from highest layer to lowest, a service data adaptation protocol (SDAP) layer 410, a PDCP layer 415, an RLC layer 420, a MAC layer 425, and a PHY layer 430. Particular instances of a protocol layer are referred to as protocol "entities." As such, protocol layers and protocol entities may be referred to interchangeably.

As illustrated by the double-arrow lines in FIG. 4A, each layer of the protocol stack implemented by the UE 404 communicates with the same layer of the base station 402, and vice versa. The two corresponding layers of the UE 404 and the base station 402 are referred to as "peers," "peer entities," and the like. Collectively, the SDAP layer 410, the PDCP layer 415, the RLC layer 420, and the MAC layer 425 are referred to as "Layer 2" or "L2." The PHY layer 430 is referred to as "Layer 1" or "L1."

Figure 4B:
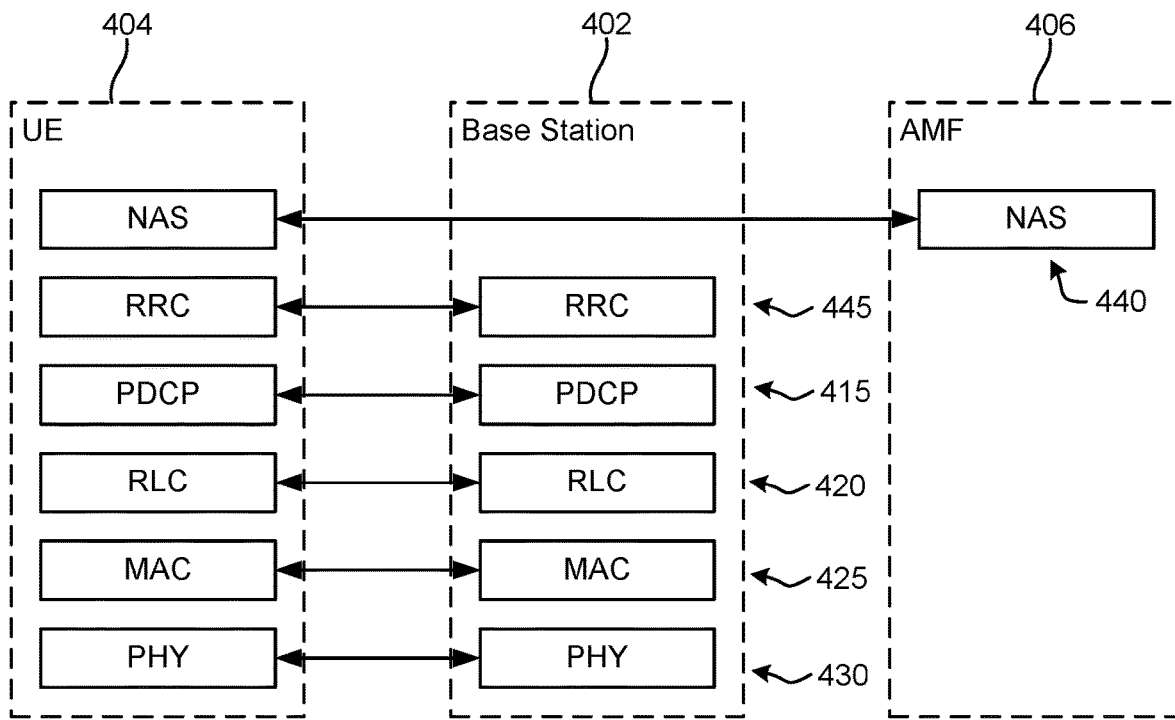

FIG. 4B illustrates a control plane protocol stack, according to aspects of the disclosure. In addition to the PDCP layer 415, the RLC layer 420, the MAC layer 425, and the PHY layer 430, the UE 404 and the base station 402 also implement an RRC layer 445. Further, the UE 404 and an AMF 406 (e.g., AMF 264) implement a NAS layer 440.

The RLC layer 420 supports three transmission modes: transparent mode (TM), unacknowledged mode (UM), and acknowledged mode (AM). In TM mode, there is no RLC header, no segmentation/reassembly, and no feedback (i.e., no acknowledgment (ACK) or negative acknowledgment (NACK)). In addition, there is buffering at the transmitter only. In UM mode, there is an RLC header, buffering at both the transmitter and the receiver, and segmentation/reassembly, but no feedback (i.e., a data transmission does not require any reception response (e.g., ACK/NACK) from the receiver). In AM mode, there is an RLC header, buffering at both the transmitter and the receiver, segmentation/reassembly, and feedback (i.e., a data transmission requires a reception response (e.g., ACK/NACK) from the receiver). Each of these modes can be used to both transmit and receive data. In TM and UM modes, a separate RLC entity is used for transmission and reception, whereas in AM mode, a single RLC entity performs both transmission and reception. Note that each logical channel uses a specific RLC mode. That is, the RLC configuration is per logical channel with no dependency on numerologies and/or transmission time interval (TTI) duration (i.e., the duration of a transmission on the radio link). Specifically, the broadcast control channel (BCCH), paging control channel (PCCH), and common control channel (CCCH) use TM mode only, the dedicated control channel (DCCH) uses AM mode only, and the dedicated traffic channel (DTCH) uses UM or AM mode. Whether the DTCH uses UM or AM is determined by RRC messaging.

The main services and functions of the RLC layer 420 depend on the transmission mode and include transfer of upper layer PDUs, sequence numbering independent of the one in the PDCP layer 415, error correction through ARQ, segmentation and re-segmentation, reassembly of service data units (SDUs), RLC SDU discard, and RLC re-establishment. The ARQ functionality provides error correction in AM mode, and has the following characteristics: ARQ retransmits RLC PDUs or RLC PDU segments based on RLC status reports, polling for an RLC status report is used when needed by RLC, and the RLC receiver can also trigger an RLC status report after detecting a missing RLC PDU or RLC PDU segment.

The main services and functions of the PDCP layer 415 for the user plane include sequence numbering, header compression and decompression (for robust header compression (ROHC) only), transfer of user data, reordering and duplicate detection (if in-order delivery to layers above the PDCP layer 415 is required), PDCP PDU routing (in case of split bearers), retransmission of PDCP SDUs, ciphering and deciphering, PDCP SDU discard, PDCP re-establishment and data recovery for RLC AM, and duplication of PDCP PDUs. The main services and functions of the PDCP layer 415 for the control plane include ciphering, deciphering, and integrity protection, transfer of control plane data, and duplication of PDCP PDUs.

The SDAP layer 410 is an access stratum (AS) layer, the main services and functions of which include mapping between a QoS flow and a data radio bearer and marking QoS flow ID in both DL and UL packets. A single protocol entity of SDAP is configured for each individual PDU session.

The main services and functions of the RRC layer 445 include broadcast of system information related to AS and NAS, paging initiated by the 5GC (e.g., NGC 210 or 260) or RAN (e.g., New RAN 220), establishment, maintenance, and release of an RRC connection between the UE and RAN, security functions including key management, establishment, configuration, maintenance, and release of signaling radio bearers (SRBs) and data radio bearers (DRBs), mobility functions (including handover, UE cell selection and reselection and control of cell selection and reselection, context transfer at handover), QoS management functions, UE measurement reporting and control of the reporting, and NAS message transfer to/from the NAS from/to the UE.

The NAS layer 440 is the highest stratum of the control plane between the UE 404 and the AMF 406 at the radio interface. The main functions of the protocols that are part of the NAS layer 440 are the support of mobility of the UE 404 and the support of session management procedures to establish and maintain IP connectivity between the UE 404 and a packet data network. The NAS layer 440 performs EPS bearer management, authentication, EPS connection management (ECM)-IDLE mobility handling, paging origination in ECM-IDLE, and security control.

Figure 5:
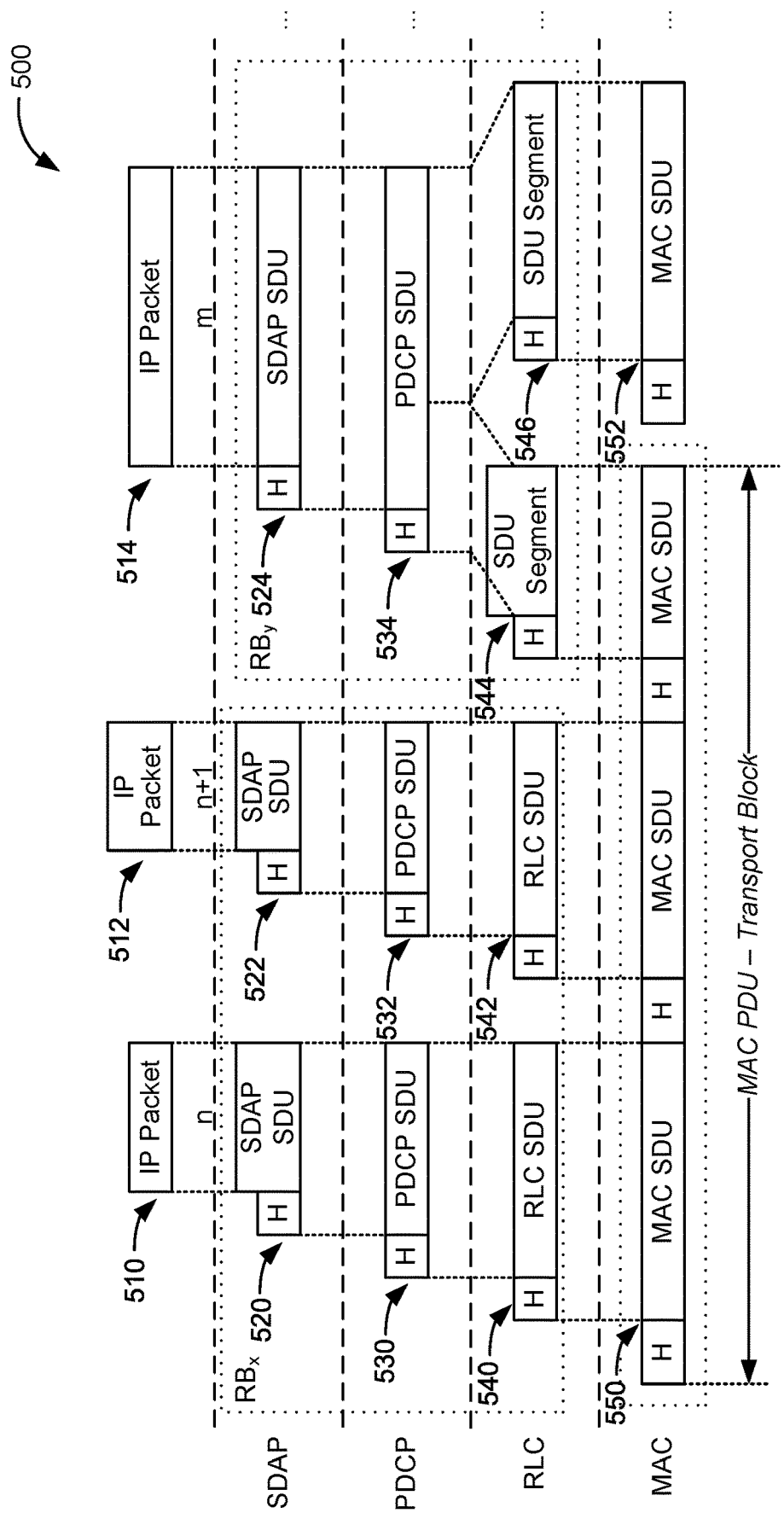
FIG. 5 illustrates an example of a Layer 2 data flow, according to aspects of the disclosure.

FIG. 5 illustrates an example of a Layer 2 data flow 500, according to aspects of the disclosure. On the transmitter side, a lower layer entity receives data from a higher layer entity. This data is referred to as an SDU. The lower layer entity will modify the data by adding a header (H) specific to that layer, thereby converting the received data (the SDU) into a PDU for that layer. Thus, as shown in FIG. 5, the SDAP layer receives IP packets 510, 512, and 514 from the IP layer, now referred to as SDAP SDUs, adds an SDAP header (H) to each to generate SDAP PDUs 520, 522, and 524, respectively, and forwards them to the PDCP layer. The PDCP layer receives the SDAP PDUs 520, 522, and 524 from the SDAP layer, now referred to as PDCP SDUs, adds a PDCP header to each to generate PDCP PDUs 530, 532, and 534, respectively, and forwards them to the RLC layer. The RLC layer receives the PDCP PDUs 530, 532, and 534 from the PDCP layer, now referred to as RLC SDUs, adds an RLC header to each to generate RLC PDUs 540, 542, 544, and 546, and forwards them to the MAC layer. Note that, in the example of FIG. 5, the PDCP PDU 534 is too large to be converted to a single RLC PDU and is therefore segmented into two RLC PDUs 544 and 546. The MAC layer receives the RLC PDUs 540, 542, 544, and 546 from the RLC layer, now referred to as MAC SDUs, and generates a transport block to send to the PHY layer (not shown). In the example of FIG. 5, the transport block is generated by concatenating two RLC PDUs from resource block "x" ($RB_x$) (RLC PDUs 540 and 542) and one RLC PDU from resource block ($RB_y$) (RLC PDU 544).

On the receiver side, the process is the reverse. That is, a peer entity receives a PDU from a lower layer (which is actually the lower layer's SDU) and converts it back into SDU(s) and passes it to the next higher layer. Thus, in the example of FIG. 5, the RLC layer receives MAC SDUs from the MAC layer, removes the RLC headers to recover the RLC SDUs, and passes the RLC SDUs to the PDCP layer. The PDCP layer removes the PDCP headers from the RLC SDUs to recover the PDCP SDUs, and passes the PDCP SDUs to the SDAP layer. The SDAP layer removes the SDAP headers from the PDCP SDUs to recover the SDAP SDUs, and passes the SDAP SDUs (e.g., IP packets 510, 512, and 514) to the next higher layer (e.g., RRC layer 545).

Note that PDUs may be either data PDUs or control PDUs. Data PDUs carry user data, for example, for an application running on a UE, and control PDUs carry control data used in the particular layer (not control plane data). Thus, for example, a PDCP data PDU is used to convey, in addition to the PDU header, user plane data, control plane data, and/or a message authentication code for integrity (MAC-I). A PDCP control PDU is used to convey, in addition to the PDU header, a PDCP status report and an interspersed ROHC feedback.

Figure 6:
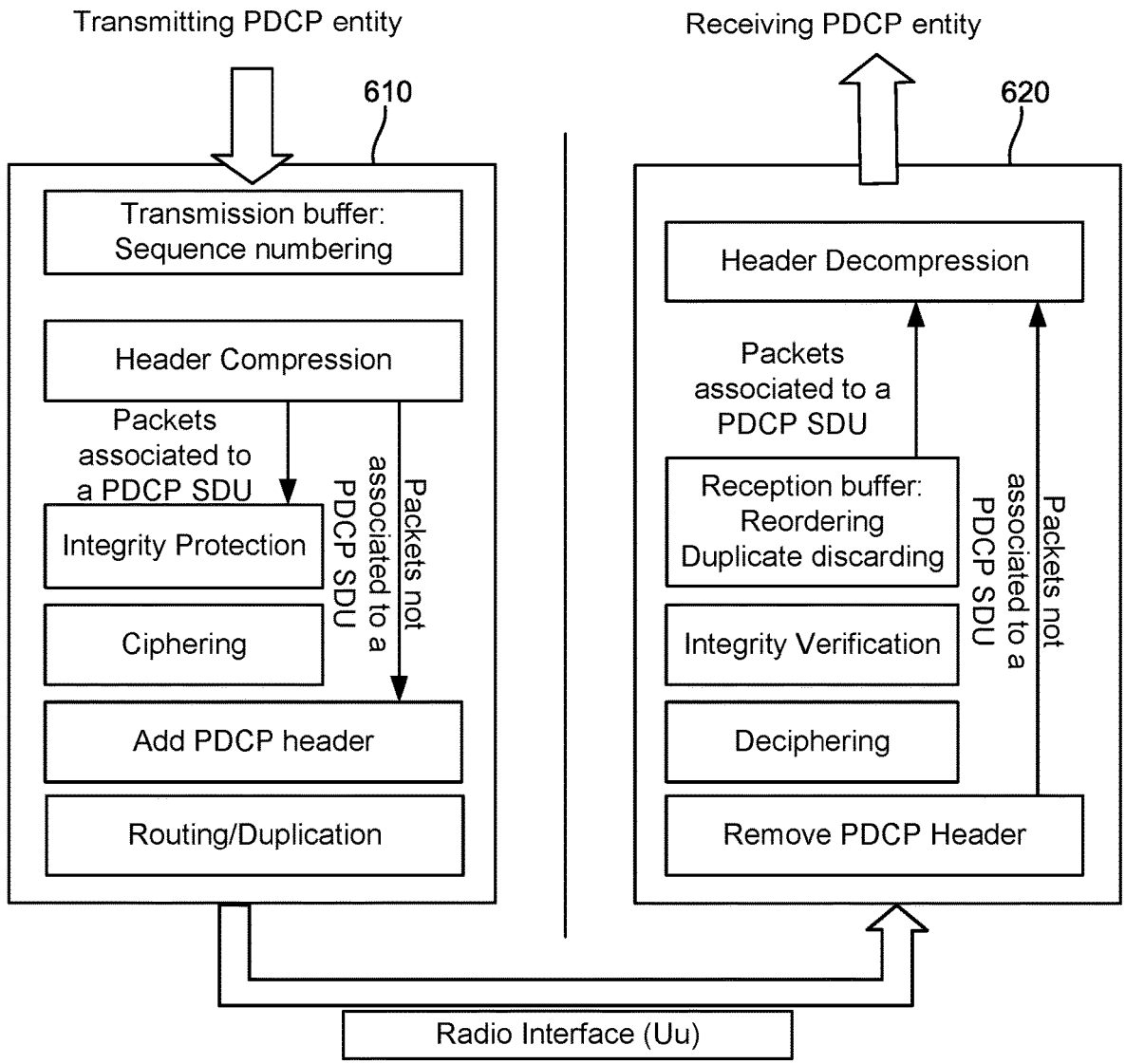
FIG. 6 illustrates a functional view of the PDCP layer, according to aspects of the disclosure.

FIG. 6 illustrates a functional view of the PDCP layer (e.g., PDCP layer 415), according to aspects of the disclosure. In the example of FIG. 6, a transmitting PDCP entity 610 is sending data (i.e., PDCP PDUs) to a receiving PDCP entity 620. The transmitting PDCP entity 610 may be implemented by either a UE or a base station, and the receiving PDCP entity 620 may be implemented by the other of the UE and the base station. PDCP entities are located in the PDCP layer. There may be several PDCP entities defined for a UE, with each PDCP entity carrying the data of one radio bearer. A PDCP entity is associated either to the control plane or the user plane depending on for which radio bearer it is carrying data. For split bearers (in dual connectivity, a bearer that is transmitted and received via both the primary and secondary cells), routing is performed in the transmitting PDCP entity.

The PDCP layer provides its services to the RRC layer (e.g., RRC layer 445) or SDAP layer (e.g., SDAP layer 410). The following services are provided by the PDCP layer to upper layers: transfer of user plane data, transfer of control plane data, header compression, ciphering, and integrity protection. A PDCP entity expects the following services from lower layers per RLC entity: acknowledged data transfer service (i.e., AM), including indication of successful delivery of PDCP PDUs (e.g., ACK/NACK), and unacknowledged data transfer service (i.e., UM).

The PDCP layer supports the following functions: transfer of data (user plane or control plane), maintenance of PDCP sequence numbers, header compression and decompression using the ROHC protocol, ciphering and deciphering, integrity protection and integrity verification, timer based SDU discard, routing for split bearers, duplication, reordering and in-order delivery, out-of-order delivery, and duplicate discarding.

As illustrated in FIG. 6, data coming into the transmitting PDCP entity 610 is first stored in a transmission buffer where it is assigned a sequence number. That is, the transmitting PDCP entity 610 adds a sequence number to each incoming block of data. Once the sequence numbers are added, the order of the blocks of data can be managed. Based on the sequence number, the receiving PDCP entity can determine whether the data is being delivered in order, whether duplicate data is being received, how to combine multiple chunks of data into an original block of data, etc.

After the sequence numbers have been assigned, header compression is performed, but just for user plane data. That means that signaling messages do not go through header compression. From here there are two paths, one for packets that are associated with a PDCP SDU and one for packets that are not. Packets that are associated with a PDCP SDU go through integrity protection and ciphering stages before the PDCP header is added, while packets that are not associated with a PDCP SDU go directly to the header step.

Integrity protection applies only to control plane data (e.g., physical downlink control channel (PDCCH) data, such as RRC/NAS messages, but not DTCH data). Ciphering applies to both control plane and user plane data. Next, a PDCP header is added to the packets, whether associated with a PDCP SDU or not. If a split bearer is established, the transmitting PDCP entity 610 routes the packets to the intended RDB. The receiving side, performed by the receiving PDCP entity 620, is simply the reverse of the transmission process performed by the transmitting PDCP entity 610.

Using RLC AM DRBs can guarantee loss-less data transmission using the RLC layer status report on the receiver side and RLC packet retransmission on the transmitter side. However, ultra-reliable low latency communications (URLLC) typically use RLC UM DRBs, as they cannot tolerate the acknowledgment and retransmission latencies associated with using RLC AM DRBs. URLLC also has a high reliability requirement, making such services sensitive to the packet loss that can occur when using RLC UM DRBs. There is a need, therefore, to provide loss-less transmission for RLC UM DRBs, especially for URLLC.

Accordingly, the present disclosure provides techniques for using PDCP layer status reports and PDCP data recovery procedures (collectively referred to as data retransmission procedures) to achieve loss-less transmission for RLC UM and RLC transparent mode (TM) DRBs. The techniques described herein allow RLC UM to achieve loss-less data transmission without using RLC AM retransmission mechanism.

As a first exemplary use case, delay-sensitive services (e.g., user datagram protocol (UDP) based gaming traffic, industrial real time control, etc.) could use RLC UM DRBs to reduce latency. The RLC UM DRBs may be configured for most, or all, of the delay-sensitive traffic due to the latency requirements of such services. Configurable higher layer feedback can assist the RLC UM DRBs to reduce/eliminate packet loss. Specifically, as described herein, the PDCP status report mechanism can be used as the higher layer feedback tool for RLC UM DRBs.

As a second exemplary use case, the reliability of RLC UM may be sufficient in normal situations, but insufficient at the cell edge where handover is triggered. In handover cases, a UE at the cell edge may experience packet loss when it is configured with RLC UM DRBs. Supporting PDCP sequence number continuity may be useful for duplicate detection during handovers, but may not reduce/eliminate packet loss. As such, data retransmission for RLC UM DRBs, as described herein, would be helpful in such handover situations.

As a third exemplary use case, during a mobile broadband (MBB) handover (illustrated in FIG. 12), a PDCP status report is useful for the target base station (e.g., a gNB) to discard the PDCP SDUs forwarded from the source base station (e.g., a gNB) and to reduce latency for RLC UM DRBs. For an MBB handover, the source base station initiates downlink data forwarding immediately after sending the MBB handover command to the UE, and the source base station can also transmit the same downlink data to the UE on the source connection. Once the UE completes the handover (i.e., transmits the RRC reconfiguration complete message), the target base station starts sending downlink data to the UE. However, because that the target base station's downlink buffer already has data forwarded from the source base station, there will be delays before fresh data can be sent to the UE by the target base station. In this case, it is necessary for the target base station to know which PDCP SDUs have been transmitted to the UE over the source base station's connection. In that way, the target base station can discard those SDUs and only transmit the non-transmitted SDUs, thereby reducing delays. In such a situation, it would be helpful for the UE to send a PDCP status report to the target base station soon after handover completion for the established RLC UM DRBs.

In the present disclosure, the PDCP entity (e.g., transmitting PDCP entity 610, receiving PDCP entity 620) can perform PDCP data retransmission procedures for RLC UM or RLC TM DRBs. In an aspect, the PDCP data retransmission procedures described herein can be performed for either uplink or downlink data transmissions. Thus, the transmitting PDCP entity 610 may be implemented by either a base station (for downlink transmission) or a UE (for uplink transmission), and the receiving PDCP entity 620 may be implemented by either a UE (for downlink transmission) or a base station (for uplink transmission).

Figure 7:
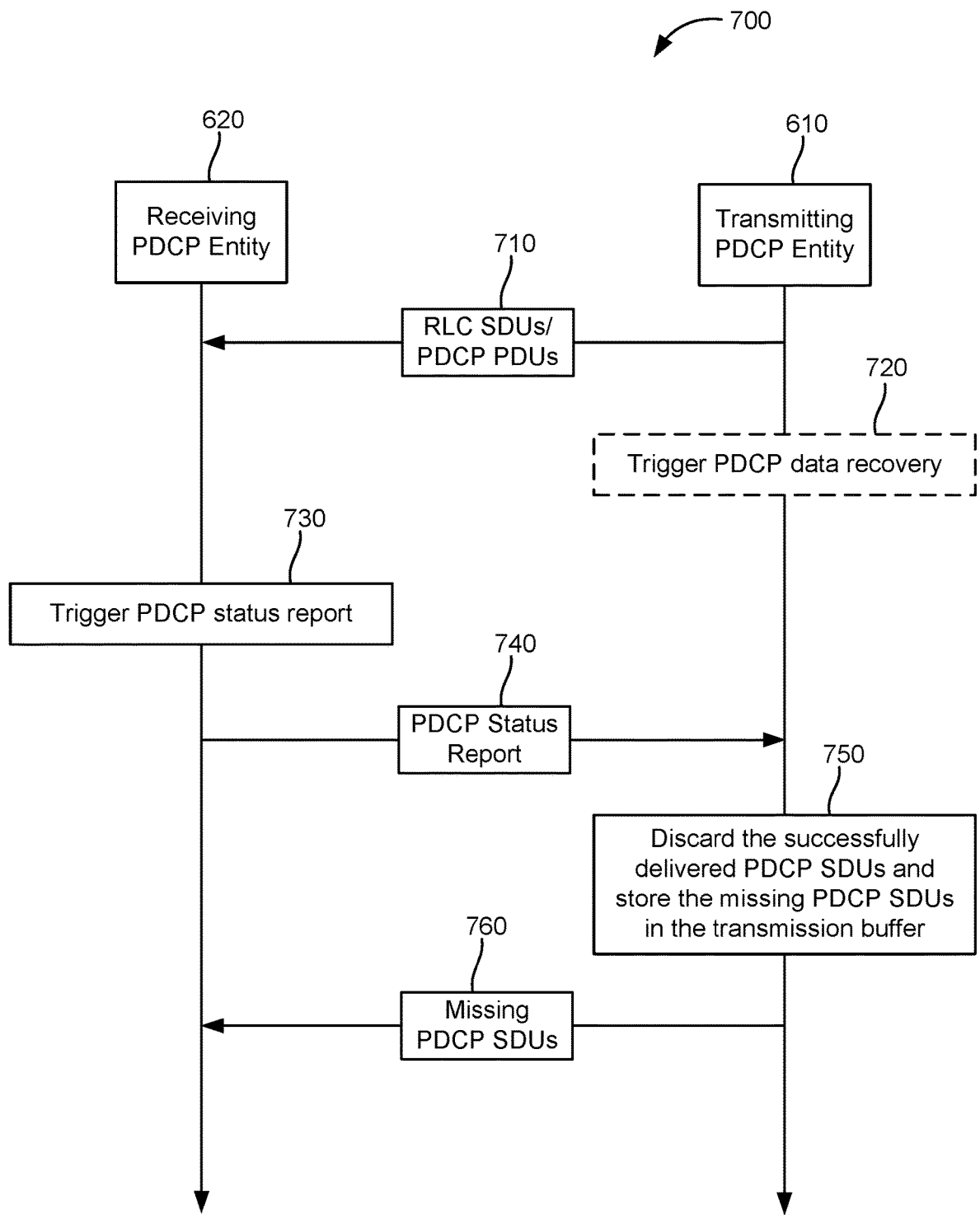
FIG. 7 illustrates an exemplary flow for PDCP data retransmission, according to aspects of the disclosure.

FIG. 7 illustrates an exemplary flow 700 for PDCP data retransmission, according to aspects of the disclosure. The method 700 may be performed by the transmitting PDCP entity 610 and the receiving PDCP entity 620 of FIG. 6.

At 710, the receiving PDCP entity 620 receives, from the receiving RLC entity, RLC SDUs received by the receiving RLC entity over an RLC non-AM DRB (e.g., an RLC UM DRB or an RLC TM DRB). As described above with reference to FIG. 5, RLC SDUs correspond to PDCP PDUs (e.g., PDCP PDUs 530, 532, 534).

At 720, at some point during or after reception of the RLC SDUs/PDCP PDUs, the transmitting PDCP entity 610 may be triggered to initiate a PDCP data recovery procedure. In an aspect, the RRC layer (e.g., RRC layer 445) can request a PDCP data recovery procedure based on specific events, such as a handover, or simply request a one-time PDCP data recovery procedure. Alternatively or additionally, the PDCP data recovery can be performed periodically. For example, a higher layer can configure the transmitting PDCP entity 610 to perform periodic PDCP data recovery. A prohibit timer can be used to prevent performing PDCP data recovery too frequently. Operation 720 is optional (as indicated by the dashed lines) because, as described below, the PDCP status report may be triggered on the receiver side without input from the transmitting side.

At 730, the receiving PDCP entity 620 is triggered to send a PDCP status report. At 740, the receiving PDCP entity 620 sends the PDCP status report to the transmitting PDCP entity 610. At 750, the transmitting PDCP entity 610 discards the successfully delivered PDCP SDUs and stores the missing PDCP SDUs in the transmission buffer. At 760, the transmitting PDCP entity 610 retransmits the missing PDCP SDUs to the receiving PDCP entity 620. Operations 730 to 760 are described further below.

Referring back to 730, the receiving PDCP entity 620 may be triggered in various ways, such as by RRC request, by periodic timer, by polling, by reordering packets exceeding a reception window, or by RRC configuration. Referring first to an RRC request trigger, when the RRC layer on the transmitter side requests that the transmitting PDCP entity 610 perform a PDCP data recovery at 720, then at 730, the RRC layer on the receiver side can trigger the receiving PDCP entity 620 to generate the PDCP status report and submit it to the lower layer (i.e., the RLC layer) as, for example, the first PDCP PDU.

Referring to a periodic timer trigger, a higher layer can configure the receiving PDCP entity 620 to periodically transmit PDCP status reports. For example, the receiving PDCP entity 620 can transmit a PDCP status report each time a periodic timer expires. The length of the timer may be configurable and may be used to prevent the receiving PDCP entity 620 from sending PDCP status reports too frequently. When the timer expires, the receiving PDCP entity 620 is permitted to send a new PDCP status report.

Referring to a polling trigger, the transmitting PDCP entity 610 can poll its peer PDCP entity, the receiving PDCP entity 620, in order to trigger the receiving PDCP entity 620 to send a PDCP status report. The transmitting PDCP entity 610 can insert a polling bit in a PDCP data PDU. The polling bit can be a single bit, such as a "1" to indicate that the receiving PDCP entity 620 should send a PDCP status report and a "0" to indicate that the receiving PDCP entity 620 should not send a PDCP status report. The timing of when to insert a polling bit can be based on, for example, a counter of the number of PDCP data PDUs that the transmitting PDCP entity 610 has submitted to a lower layer (i.e., the RLC layer). In an aspect, the counter may account for the packet size of the PDCP data PDUs submitted to the lower layer. For example, the larger the packet size of the PDCP data PDUs, the fewer PDCP data PDUs transmitted before a PDCP status report is triggered. When the counter reaches the configured threshold, the transmitting PDCP entity 610 sets the polling bit to "1," otherwise the polling bit remains "0." Once the polling bit is inserted into a PDCP data PDU, the counter should be reset. In an aspect, the polling bit should be set to "1" in the last PDCP data PDU in the PDCP transmission buffer (see FIG. 6) if the buffer is empty.

Figure 8:
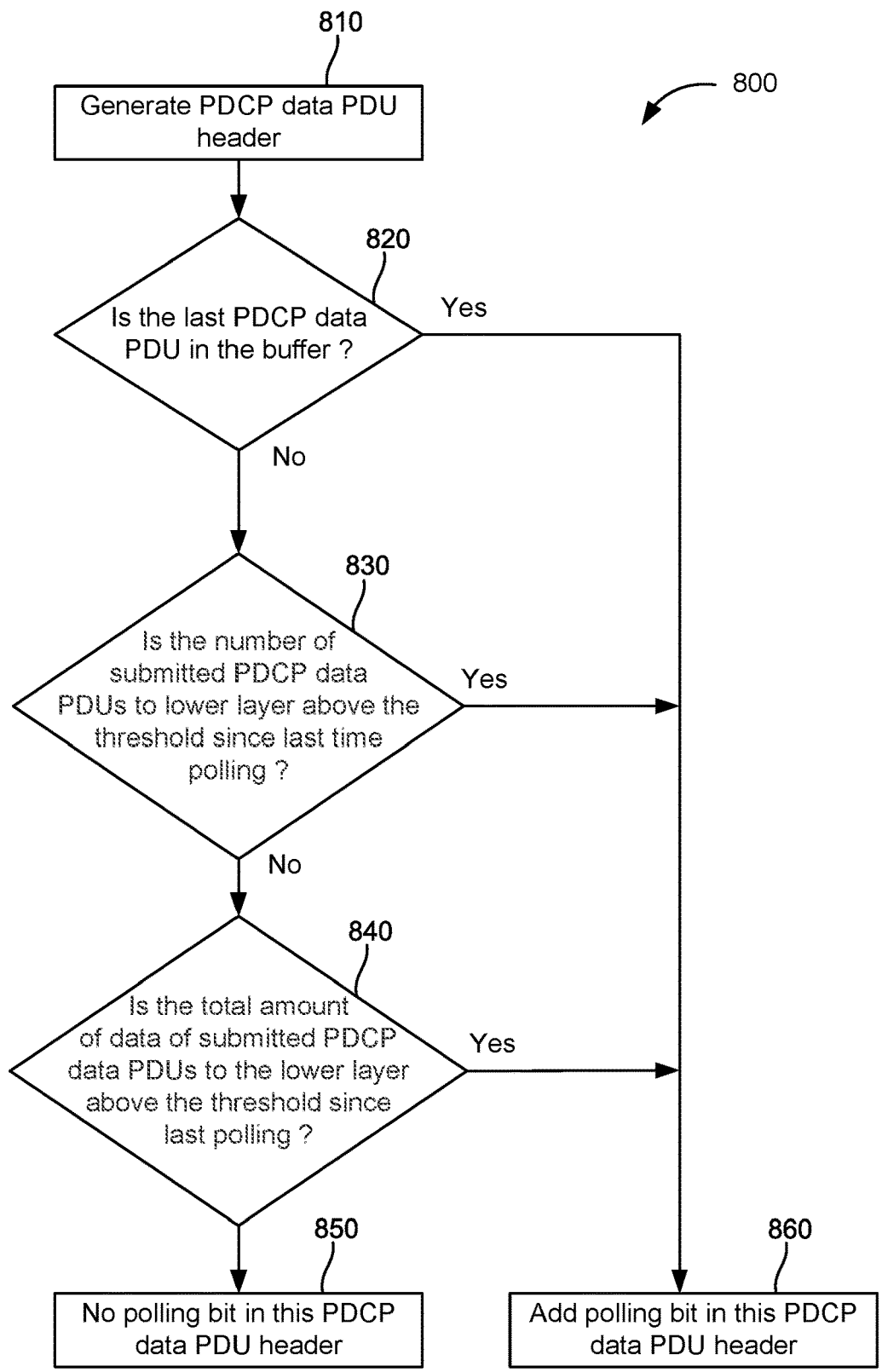
FIG. 8 illustrates an exemplary method for determining whether to insert a polling bit in a PDCP data PDU, according to aspects of the disclosure.

FIG. 8 illustrates an exemplary method 800 for determining whether to insert a polling bit into a PDCP data PDU, according to aspects of the disclosure. The method 800 may be performed by the transmitting PDCP entity 610. At 810, the transmitting PDCP entity 610 generates a PDCP header to create a PDCP data PDU from an SDAP PDU (e.g., SDAP PDU 520, 522, 524). At 820, the transmitting PDCP entity 610 determines whether the PDCP data PDU is the last PDDCP data PDU in the transmission buffer. If it is not, then at 830, the transmitting PDCP entity 610 determines whether the number of PDCP data PDUs transmitted to the lower layer (i.e., the RLC layer) since the last polling is greater than a threshold. If it is not, then at 840, the transmitting PDCP entity 610 determines whether the total amount of data across all of the PDCP data PDUs transmitted to the lower layer (i.e., the RLC layer) since the last polling is greater than a threshold. If it is not, then at 850, the transmitting PDCP entity 610 does not insert a polling bit (i.e., does not change the polling bit from "0" to "1") in the PDCP data PDU. However, if any of the determinations at 820, 830, and 840 are "yes," then the transmitting PDCP entity 610 inserts a polling bit (i.e., changes the polling bit from "0" to "1") into the header of the PDCP data PDU.

Figure 9A:
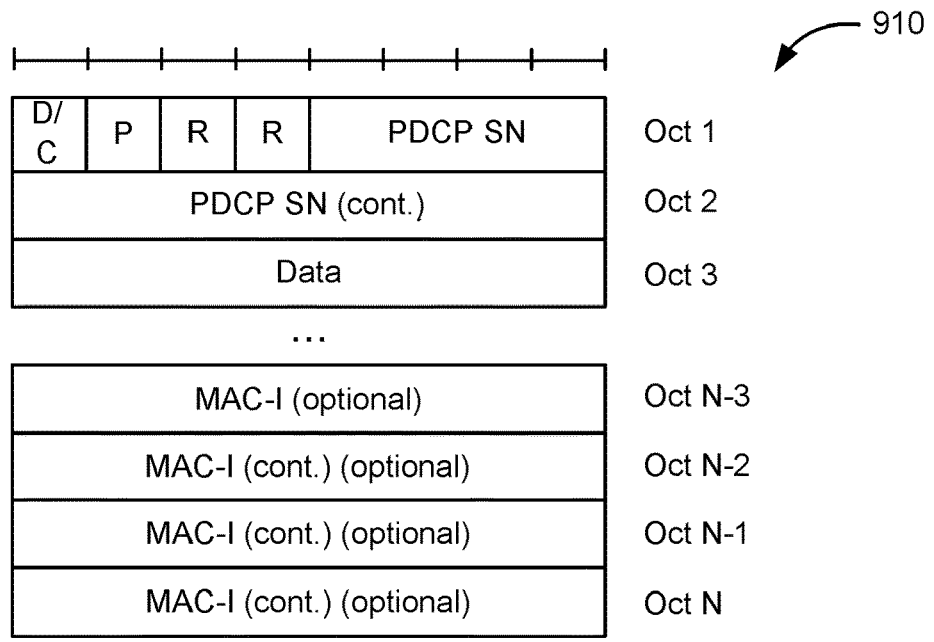
FIGS. 9A and 9B illustrate exemplary PDCP data PDUs that include a polling bit in the header, according to aspects of the disclosure.
Figure 9B:
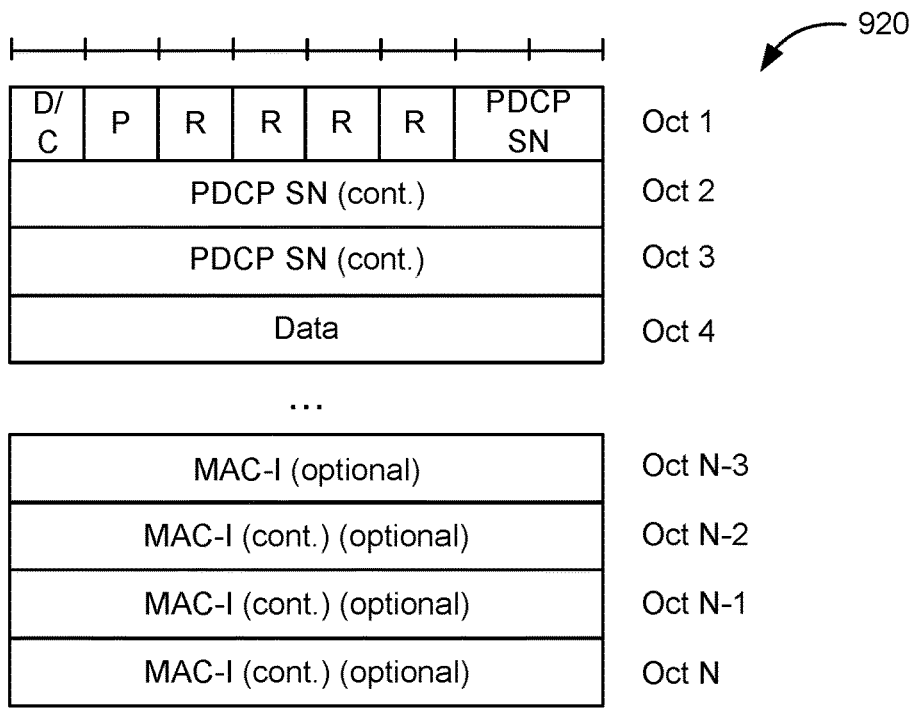

FIGS. 9A and 9B illustrate exemplary PDCP data PDUs that include a polling bit in the header, according to aspects of the disclosure. A PDCP PDU is a bit string that is byte aligned (i.e., a multiple of 8 bits) in length. In FIGS. 9A and 9B, bit strings are represented by tables in which the most significant bit is the leftmost bit of the first line of the table and the least significant bit is the rightmost bit on the last line of the table. The hashed line above each PDCP data PDU represents the bit demarcations of each row.

FIG. 9A shows the format of a PDCP data PDU 910 with 12 bits for the PDCP sequence number (SN). As shown in FIG. 9A, the first reserved (R) bit can be used as the polling (P) bit. Otherwise, reserved bits are set to "0" and ignored by the receiver. FIG. 9B shows the format of a PDCP data PDU 920 with 18 bits for the PDCP sequence number (SN). As in FIG. 9A, in FIG. 9B, the first reserved bit can be used as the polling (P) bit.

Note that the D/C bit indicates whether the corresponding PDCP PDU is a PDCP data PDU or a PDCP control PDU. The data field may be a variable number of bytes and include an uncompressed PDCP SDU (user plane data or control plane data) or a compressed PDCP SDU (user plane data only). The MAC-I field has a length of 32 bits (four bytes) and carries a message authentication code. For DRBs, the MAC-I field is present only when the DRB is configured with integrity protection.

Referring back to 730 of FIG. 7, and specifically to a reception window trigger, the receiving PDCP entity 620 can determine that the sequence number of the next PDCP data packet expected to be received is greater than the sequence number of the first PDCP data packet not delivered to an upper layer by the length of a reception window. For example, if a value of the parameter RX_NEXT is larger than a value of the parameter RX_DELIV plus the length of the reception window, the receiving PDCP entity 620 is triggered to send a PDCP status report. The parameter RX_NEXT indicates the COUNT value of the next PDCP SDU expected to be received, and the parameter RX_DELIV indicates the COUNT value of the first PDCP SDU not delivered to the upper layers, but still being waited for by the receiving PDCP entity 620. The parameter COUNT may be composed of a hyper framer number (HFN) and the PDCP sequence number. The length of the reception window may be configurable, for example, by the base station. An example of a reception window is shown with reference to FIG. 10.

Figure 10:
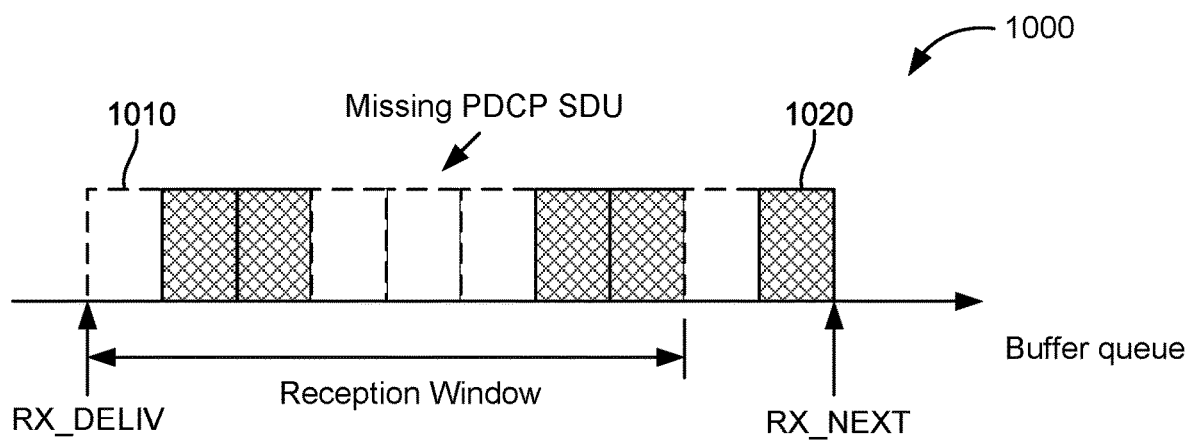
FIG. 10 illustrates a data flow comprised of a series of PDCP SDUs, according to aspects of the disclosure.

FIG. 10 illustrates a data flow 1000 comprised of a series of PDCP SDUs, according to aspects of the disclosure. As shown in FIG. 10, the first location 1010 is the location of the first PDCP SDU not delivered to the upper layers, but still being waited for by the receiving PDCP entity 620, as indicated by the parameter RX_DELIV. In the example of FIG. 10, the length of the reception window is eight PDCP SDUs. As shown in FIG. 10, the next PDCP SDU expected to be received, indicated by the parameter RX_NEXT, is at the tenth location 1020 of the data flow 1000. Because the gap between the first PDCP SDU not delivered to the upper layers but still being waited for, that is, the PDCP SDU expected at location 1010, and the next PDCP SDU expected to be received, that is, the PDCP SDU at location 1020, is greater than the reception window, a PDCP status report is triggered.

Referring back to 730 of FIG. 7, and specifically to the RRC configuration trigger, the transmitter (e.g., a base station) can use RRC signaling to configure the receiver (e.g., a UE) to send a PDCP status report. In an aspect, the UE can send a PDCP status report for the RLC UM and/or RLC TM DRB(s) to the target base station shortly after handover completion to indicate to the target base station which PDCP SDUs the UE has received so far. The target base station can then discard the PDCP SDUs forwarded from the source base station that it has stored in the transmission buffer that the UE has already received, thereby reducing delays for the RLC UM and/or RLC TM DRB(s).

In another aspect, the source base station can send a PDCP sequence number status transfer message to the target base station indicating the last PDCP downlink SDU sequence number that was transmitted for RLC UM and/or RLC TM DRB(s) on the source connection.

Referring back to FIG. 7, once a PDCP status report has been triggered at 730, the receiving PDCP entity 620 generates the PDCP status report and submits it to the lower layer (i.e., the RLC layer) as, for example, the first PDCP PDU. The PDCP status report includes information about the first missing COUNT (FMC) at the receiving PDCP entity 620 and optionally a bitmap of the successfully and/or unsuccessfully received PDCP data PDUs. Note that a PDCP status report is generated (730) at the receiver side to indicate and report the successful and unsuccessful received PDCP data PDUs, while PDCP data recovery (720) is executed at the transmitter side to retransmit the unsuccessful PDCP data PDUs based on the PDCP status report.

Figure 11:
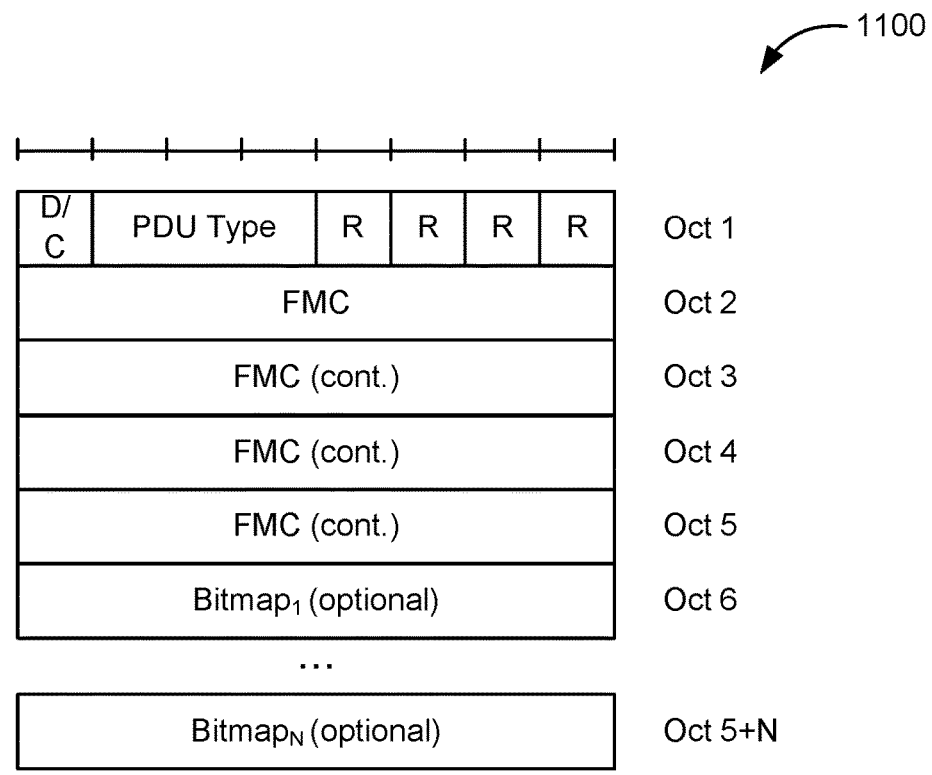
FIG. 11 illustrates an exemplary PDCP control PDU carrying one PDCP status report, according to aspects of the disclosure.

Still referring to FIG. 7, and operation 740 specifically, the PDCP status report is conveyed to the transmitting PDCP entity 610 in a PDCP control PDU. FIG. 11 illustrates an exemplary PDCP control PDU 1100 carrying one PDCP status report, according to aspects of the disclosure. The PDU type field indicates the type of control information included in the corresponding PDCP control PDU 1100. For a PDCP status report, this field may contain the 3-bit value "000." The FMC field indicates the COUNT value of the first missing PDCP SDU within the reordering window, that is, RX_DELIV. The bitmap field indicates which SDUs are missing and which SDUs are correctly received at the receiving PDCP entity 620. The bit position of the Nth bit in the bitmap is "N" meaning, for example, the bit position of the first bit in the bitmap is "1."

Note that a PDCP status report is used for downlink transmissions from a base station to a UE, insofar as a UE can be triggered to send a PDCP status report. For uplink transmissions, a base station would send a PDCP SN status transfer message to the UE identifying the successfully/unsuccessfully received PDCP data PDUs.

Once the transmitting PDCP entity 610 receives the PDCP status report, it retransmits the missing PDCP SDUs according to the latest PDCP status report. Referring back to FIG. 7, and specifically to operation 750, for the RLC UM and/or RLC TM DRB(s) and for each PDCP SDU in the PDCP transmission buffer of the transmitting PDCP entity 610, if a bit in the bitmap in the received PDCP status report is set to "1," or the associated COUNT value for the PDCP SDU is less than the value of the FMC, the PDCP SDU is considered to have been successfully delivered and is discarded from the PDCP transmission buffer. If, however, the bit is set to "0," the PDCP SDU is stored in the transmission buffer and retransmitted to the receiving PDCP entity 620 at 760 of FIG. 7.

As will be appreciated, because the PDCP entity requests retransmission of missing packets, the RLC layer, despite operating over an RLC UM and/or RLC TM DRB and therefore not requesting retransmission of missing packets, will receive the missing packets. As such, URLLC services using RLC UM/TM DRBs can achieve the high reliability requirements of these services while enjoying the low latencies of RLC UM and TM.

Referring back to the third exemplary use case described above, FIG. 12 illustrates an exemplary MBB handover message flow 1200, according to aspects of the disclosure. At stage 1, a UE 1202 (e.g., any of the UEs described herein) detects an event trigger, such as a weakening signal strength of transmissions received from a source base station, illustrated as a source gNB 1204 (e.g., any of the base stations described herein). At stage 2, the UE 1202 sends a measurement report of neighboring base stations (e.g., gNBs) to the source gNB 1204. At stage 3, the source gNB 1204 determines to handover (HO) the UE 1202 to a target base station, illustrated as a target gNB 1206. At stage 4, the source gNB 1204 communicates with the target gNB 1206 to prepare for the handover. At stage 5, the source gNB 1204 sends an RRC connection reconfiguration message to the UE 1202. At stage 6, the UE 1202 and the source gNB 1204 exchange user data through a user interface referred to as the "U2" interface. At stage 7, the source gNB exchanges user data with the UPF 1262 (e.g., UPF 262 in FIG. 2B) through a user interface referred to as the "U3" interface. At stage 8, the source gNB 1204 forwards downlink user data to the target gNB 1206. At stage 9, the UE 1202 continues user data transmission/reception with the source gNB 1204.

At stage 10, the UE 1202 connects to the target gNB 1206 via synchronization and RACH procedures on a target cell of the target gNB 1206. At this point, both the target gNB 1206 and the source gNB 1204 transmit user data to the UPF 1262; hence, the box including stages 9 and 10 is shown as extending to the UPF 1262. At stage 11, the UE 1202 sends an RRC reconfiguration complete message to the target gNB 1206. At stage 12, as a first option, the UE 1202 sends a PDCP status report to the target gNB 1206 for RLC AM or RLC UM bearers. At stage 13, the target gNB 1206 sends a handover connection setup complete message to the source gNB 1204, and the source gNB 1204 stops transmitting and receiving data to and from the UE 1202. At stage 14, as a second option (instead of the first option at stage 12), the source gNB 1204 sends a sequence number (SN) "status transfer" message to the target gNB 1206, which can provide the uplink PDCP data status or downlink PDCP sequence number. Note that the box with the diagonal hash lines indicates that, during these stages, the UE 1202 will transmit and receive data via the source gNB 1204, and the box with the horizontal hash lines indicates that the UE 1202 will transmit and receive data via the target gNB 1206.

Figure 12:
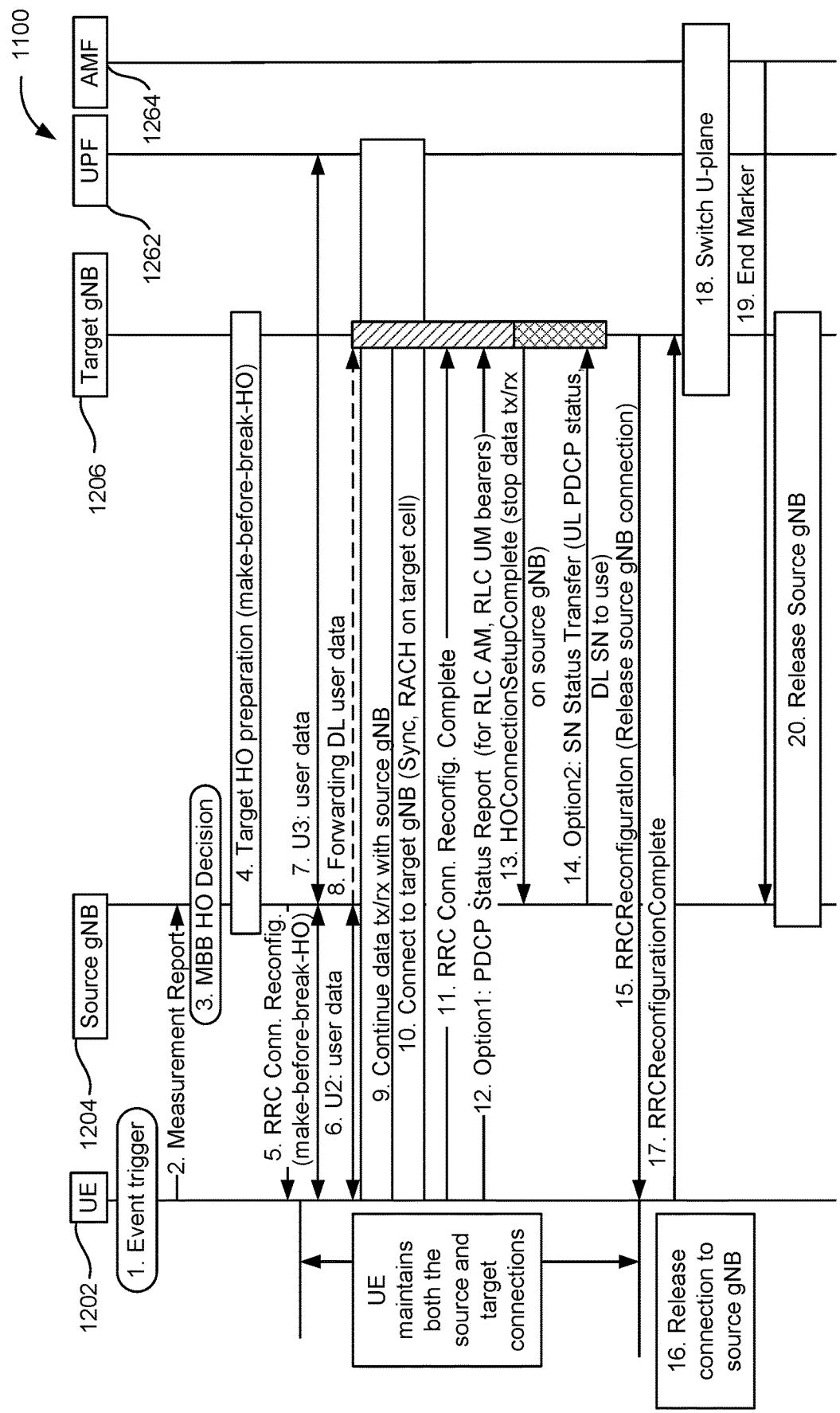
FIG. 12 illustrates an exemplary MBB handover message flow, according to aspects of the disclosure.

At stage 15, the target gNB 1206 sends an RRC reconfiguration message to the UE 1202 instructing it to release the connection to the source gNB 1204. At stage 16, the UE 1202 releases the connection to the source gNB 1204. At stage 17, the UE 1202 sends an RRC reconfiguration complete message to the target gNB 1206. At stage 18, the AMF 1264 (e.g., AMF 264 in FIG. 2B) switches the user plane to the target gNB 1206. At stage 19, the AMF 1264 sends an end marker to the source gNB 1204. At stage 20, the target gNB 1206 releases the source gNB 1204. As illustrated in FIG. 12, the UE 1202 maintains a connection to both the source gNB 1204 and the target gNB 1206 until it receives an RRC reconfiguration message from the target gNB 1206 at stage 15. In the meantime, the UE 1202 continues data transmission and reception with the source gNB 1204.

Figure 13:
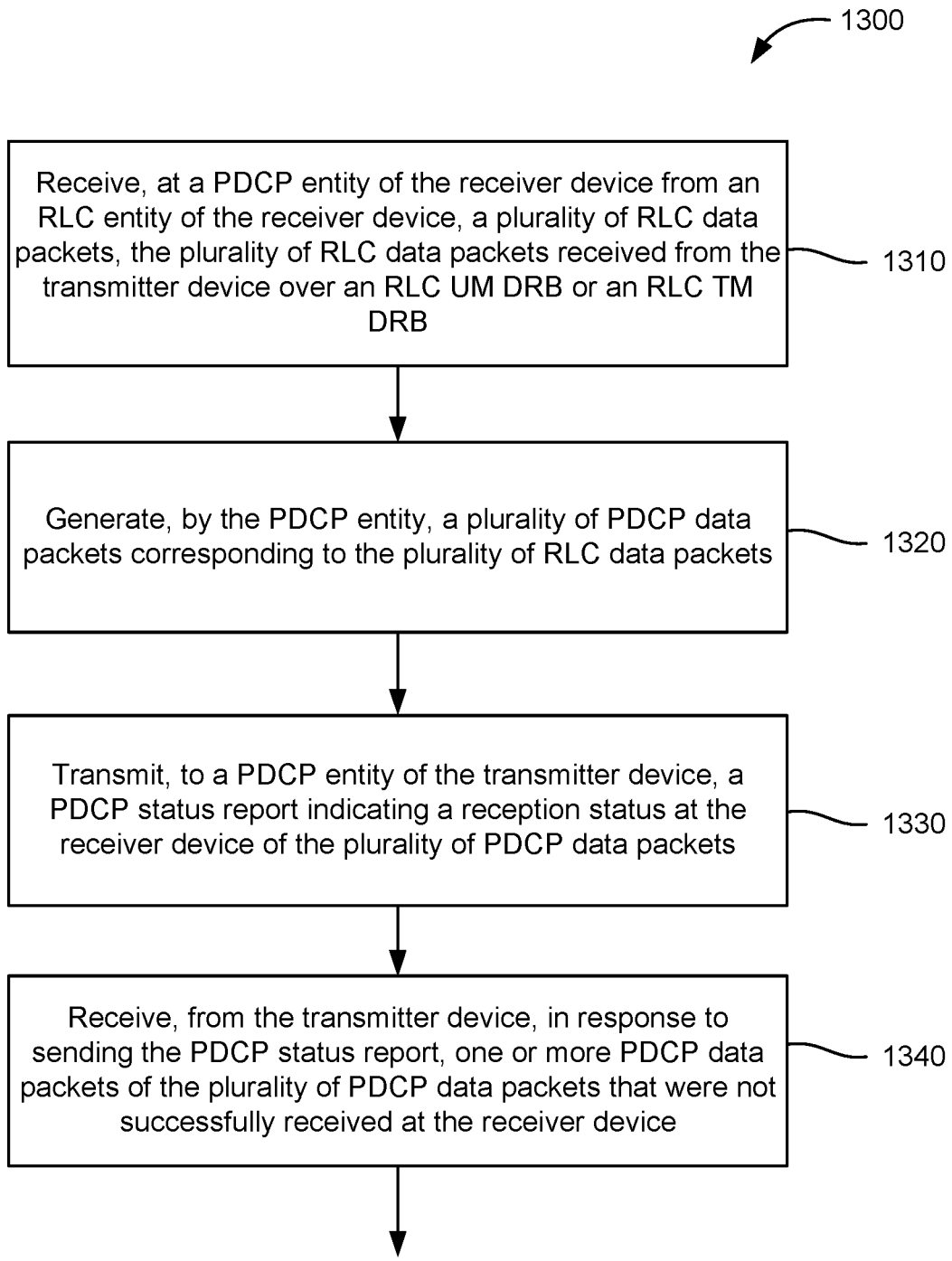
FIGS. 13 and 14 illustrate exemplary method for wireless communication, according to various aspects described herein.

FIG. 13 illustrates an exemplary method 1300 for wireless communication, according to aspects of the disclosure. The method 1300 may be performed by a receiver device, such as a UE or base station (e.g., any of the UEs or base stations, respectively, described herein).

At 1310, a PDCP entity of the receiver device (e.g., receiving PDCP entity 620) receives, from an RLC entity of the receiver device, a plurality of RLC data packets (e.g., RLC SDUs/PDCP PDUs). In an aspect, the plurality of RLC data packets are received from the transmitter device over an RLC UM DRB or an RLC TM DRB. In an aspect, where the receiver device is a UE, operation 1310 may be performed by WWAN transceiver 310, processing system 332, memory component 340, and/or PDCP recovery component 342, any or all of which may be considered means for performing this operation. Where the receiver device is a base station, operation 1310 may be performed by WWAN transceiver 350, processing system 384, memory component 386, and/or PDCP recovery component 388, any or all of which may be considered means for performing this operation.

At 1320, the PDCP entity of the receiver device generates a plurality of PDCP data packets (e.g., PDCP SDUs) corresponding to the plurality of RLC data packets. In an aspect, where the receiver device is a UE, operation 1320 may be performed by WWAN transceiver 310, processing system 332, memory component 340, and/or PDCP recovery component 342, any or all of which may be considered means for performing this operation. Where the receiver device is a base station, operation 1320 may be performed by WWAN transceiver 350, processing system 384, memory component 386, and/or PDCP recovery component 388, any or all of which may be considered means for performing this operation.

At 1330, the receiver device transmits, to a PDCP entity of the transmitter device, a PDCP status report indicating a reception status at the receiver device of the plurality of PDCP data packets. In an aspect, the transmitting at 1330 may be in response to receiving, from an RRC entity of the receiver device, a request to send the PDCP status report. In an aspect, the request to send the PDCP status report may be received in response to initiation of a PDCP recovery procedure at the transmitter device. In an aspect, the transmitting at 1330 may be in response to receiving, at the PDCP entity, a polling bit for the PDCP status report in one of the plurality of PDCP data packets. In an aspect, the transmitting at 1330 may be in response to determining that a periodic timer for sending the PDCP status report has expired. In an aspect, the transmitting at 1330 may be in response to determining that a sequence number of a next PDCP data packet expected to be received is greater than a sequence number of a first PDCP data packet not delivered to an upper layer by a length of a reception window, wherein the reception window represents a predetermined number of PDCP data packets, as described above with reference to FIG. 10. In an aspect, the transmitting at 1330 may be in response to receiving an RRC configuration to send the PDCP status report. The RRC configuration may be received in response to a handover of the receiver device from a first base station to a second base station. In an aspect, the transmitter device may be the first base station. Alternatively, the transmitter device may be the second base station. In an aspect, where the receiver device is a UE, operation 1330 may be performed by WWAN transceiver 310, processing system 332, memory component 340, and/or PDCP recovery component 342, any or all of which may be considered means for performing this operation. Where the receiver device is a base station, operation 1330 may be performed by WWAN transceiver 350, processing system 384, memory component 386, and/or PDCP recovery component 388, any or all of which may be considered means for performing this operation.

At 1340, the PDCP entity receives, from the transmitter device, in response to sending the PDCP status report, one or more PDCP data packets of the plurality of PDCP data packets that were not successfully received at the receiver device. In an aspect, where the receiver device is a UE, operation 1350 may be performed by WWAN transceiver 310, processing system 332, memory component 340, and/or PDCP recovery component 342, any or all of which may be considered means for performing this operation. Where the receiver device is a base station, operation 1350 may be performed by WWAN transceiver 350, processing system 384, memory component 386, and/or PDCP recovery component 388, any or all of which may be considered means for performing this operation.

Figure 14:
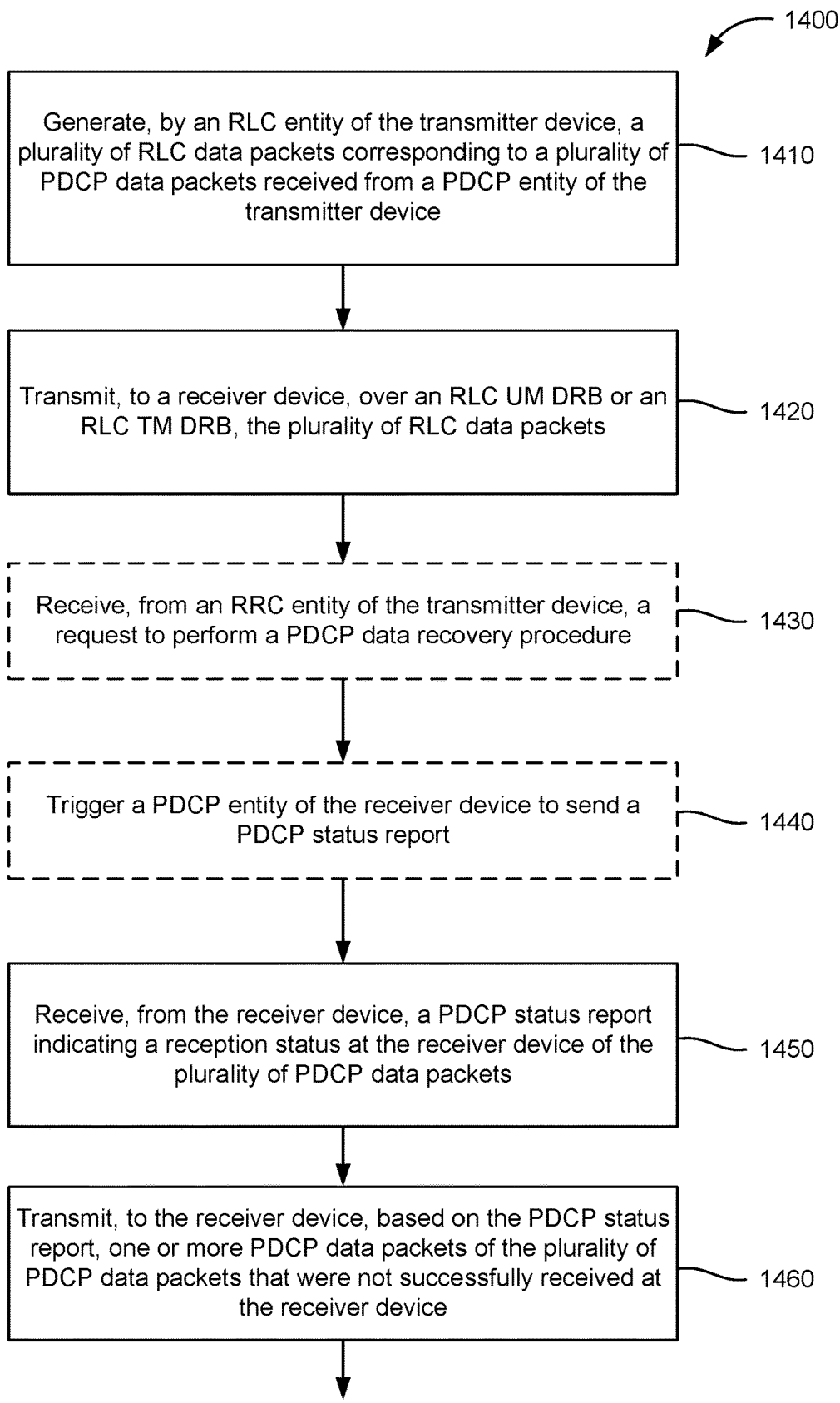

FIG. 14 illustrates an exemplary method 1400 for wireless communication, according to aspects of the disclosure. The method 1400 may be performed by a transmitter device, such as a base station or a UE (e.g., any of the base stations or UEs, respectively, described herein).

At 1410, an RLC entity of the transmitter device generates a plurality of RLC data packets corresponding to a plurality of PDCP data packets received from a PDCP entity of the transmitter device (e.g., transmitting PDCP entity 610). In an aspect, where the transmitter device is a UE, operation 1410 may be performed by WWAN transceiver 310, processing system 332, memory component 340, and/or PDCP recovery component 342, any or all of which may be considered means for performing this operation. Where the transmitter device is a base station, operation 1410 may be performed by WWAN transceiver 350, processing system 384, memory component 386, and/or PDCP recovery component 388, any or all of which may be considered means for performing this operation.

At 1420, the RLC entity transmits, to a receiver device (e.g., a UE or base station), over an RLC UM DRB or an RLC TM DRB, the plurality of RLC data packets. In an aspect, where the transmitter device is a UE, operation 1420 may be performed by WWAN transceiver 310, processing system 332, memory component 340, and/or PDCP recovery component 342, any or all of which may be considered means for performing this operation. Where the transmitter device is a base station, operation 1420 may be performed by WWAN transceiver 350, processing system 384, memory component 386, and/or PDCP recovery component 388, any or all of which may be considered means for performing this operation.

At 1430, the PDCP entity optionally receives, from an RRC entity of the transmitter device, a request to perform a PDCP data recovery procedure. The request to perform the PDCP data recovery procedure may be received in response to a handover of the receiver device from a first base station to a second base station. In an aspect, the transmitter device may be the first base station. Alternatively, the transmitter device may be the second base station. In an alternative aspect, the PDCP entity may initiates a PDCP data recovery procedure upon expiration of a periodic timer. In an aspect, where the transmitter device is a UE, operation 1430 may be performed by WWAN transceiver 310, processing system 332, memory component 340, and/or PDCP recovery component 342, any or all of which may be considered means for performing this operation. Where the transmitter device is a base station, operation 1430 may be performed by WWAN transceiver 350, processing system 384, memory component 386, and/or PDCP recovery component 388, any or all of which may be considered means for performing this operation.

At 1440, the PDCP entity optionally triggers the PDCP entity of the receiver device to send the PDCP status report. In an aspect, the triggering at 1440 may include transmitting a polling bit for the PDCP status report in one of the plurality of PDCP data packets. In an aspect, the polling bit may be transmitted based on a number of the plurality of PDCP data packets submitted to the RLC entity being greater than a threshold, a total amount of data of the plurality of PDCP data packets submitted to the RLC entity being greater than a threshold, or any combination thereof. In an aspect, based on a PDCP buffer of the PDCP entity being empty, the PDCP entity may insert the polling bit in a last PDCP data packet of the plurality of PDCP data packets. In an aspect, where the transmitter device is a UE, operation 1440 may be performed by WWAN transceiver 310, processing system 332, memory component 340, and/or PDCP recovery component 342, any or all of which may be considered means for performing this operation. Where the transmitter device is a base station, operation 1440 may be performed by WWAN transceiver 350, processing system 384, memory component 386, and/or PDCP recovery component 388, any or all of which may be considered means for performing this operation.

At 1450, the PDCP entity receives, from the receiver device, a PDCP status report indicating a reception status at the receiver device of the plurality of PDCP data packets. Operations 1430 and 1440 are optional because the recovery procedure may not be triggered by an RRC request, but rather, by reception of the PDCP status report. For example, in an aspect, the transmitter device may receive the PDCP status report after a periodic timer for sending the PDCP status report has expired. Alternatively, the transmitter device may receive the PDCP status report in response to a handover of the receiver device from a first base station to a second base station. In an aspect, the PDCP status report may include a sequence number of a first missing PDCP data packet of the plurality of PDCP data packets. In an aspect, the PDCP status report may include a bitmap of successfully, unsuccessfully, or both successfully and unsuccessfully received PDCP data packets of the plurality of PDCP data packets. In an aspect, where the transmitter device is a UE, operation 1450 may be performed by WWAN transceiver 310, processing system 332, memory component 340, and/or PDCP recovery component 342, any or all of which may be considered means for performing this operation. Where the transmitter device is a base station, operation 1450 may be performed by WWAN transceiver 350, processing system 384, memory component 386, and/or PDCP recovery component 388, any or all of which may be considered means for performing this operation.

At 1460, the PDCP entity transmits, to the receiver device, based on the PDCP status report, one or more PDCP data packets of the plurality of PDCP data packets that were not successfully received at the receiver device. In an aspect, where the transmitter device is a UE, operation 1460 may be performed by WWAN transceiver 310, processing system 332, memory component 340, and/or PDCP recovery component 342, any or all of which may be considered means for performing this operation. Where the transmitter device is a base station, operation 1460 may be performed by WWAN transceiver 350, processing system 384, memory component 386, and/or PDCP recovery component 388, any or all of which may be considered means for performing this operation.

In an aspect, the method 1400 may further include (not shown) discarding, from a PDCP buffer of the PDCP entity, the successfully received PDCP data packets of the plurality of PDCP data packets represented by the PDCP status report. In an aspect, the method 1400 may further include (not shown) storing, in a PDCP buffer of the PDCP entity, the one or more PDCP data packets of the plurality of PDCP data packets that were not successfully received at the receiver device. In an aspect, where the transmitter device is a UE, these optional operations may be performed by WWAN transceiver 310, processing system 332, memory component 340, and/or PDCP recovery component 342, any or all of which may be considered means for performing this operation. Where the transmitter device is a base station, these operations may be performed by WWAN transceiver 350, processing system 384, memory component 386, and/or PDCP recovery component 388, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for wireless communication performed by a receiver device, comprising:
   receiving, at a packet data convergence protocol (PDCP) entity of the receiver device from a radio link control (RLC) entity of the receiver device, a plurality of RLC data packets, the plurality of RLC data packets received from a transmitter device over an RLC unacknowledged mode (UM) data radio bearer (DRB);
   generating, by the PDCP entity, a plurality of PDCP data packets corresponding to the plurality of RLC data packets;
   receiving, in response to a handover of the receiver device from a first base station to a second base station, an RRC configuration to send a PDCP status report;
   transmitting the PDCP status report to a PDCP entity of the second base station after the handover, the PDCP status report indicating a reception status at the receiver device of the plurality of PDCP data packets; and
   receiving, in response to sending the PDCP status report, one or more PDCP data packets of the plurality of PDCP data packets that were not successfully received at the receiver device.

2. The method of claim 1, further comprising:
   receiving, from a radio resource control (RRC) entity of the receiver device, a request to send the PDCP status report.

3. The method of claim 2, wherein the request to send the PDCP status report is received in response to initiation of a PDCP recovery procedure at the transmitter device.

4. The method of claim 1, further comprising:
   determining that a periodic timer for sending the PDCP status report has expired.

5. The method of claim 1, further comprising:
   determining that a sequence number of a next PDCP data packet expected to be received is greater than a sequence number of a first PDCP data packet not delivered to an upper layer entity of the receiver device by a length of a reception window, wherein the reception window represents a predetermined number of PDCP data packets.

6. The method of claim 1, wherein the transmitter device is the first base station.

7. The method of claim 1, wherein the PDCP status report includes a sequence number of a first missing PDCP data packet of the plurality of PDCP data packets.

8. The method of claim 1, wherein the PDCP status report includes a bitmap of successfully, unsuccessfully, or both successfully and unsuccessfully received PDCP data packets of the plurality of PDCP data packets.

9. The method of claim 1, wherein the transmitter device is a base station and the receiver device is a user equipment (UE).

10. The method of claim 1, further comprising:
    receiving, at the PDCP entity, a polling bit for the PDCP status report in one of the plurality of PDCP data packets.

11. The method of claim 1, wherein the receiver device maintains a connection to the first base station until reception of a configuration from the second base station to release the connection to the first base station.

12. A method for wireless communication performed by a transmitter device, comprising:

generating, by a radio link control (RLC) entity of the transmitter device, a plurality of RLC data packets corresponding to a plurality of packet data convergence protocol (PDCP) data packets received from a PDCP entity of the transmitter device;
transmitting, to a receiver device, over an RLC unacknowledged mode (UM) data radio bearer (DRB), the plurality of RLC data packets;
receiving, in response to a handover of the receiver device from a first base station to a second base station, the PDCP status report from the receiver device, the PDCP status report indicating a reception status at the receiver device of the plurality of PDCP data packets; and
transmitting, to the receiver device, based on the PDCP status report, one or more PDCP data packets of the plurality of PDCP data packets that were not successfully received at the receiver device.

13. The method of claim 12, wherein, based on a PDCP buffer of the PDCP entity being empty, the PDCP entity inserts a polling bit in a last PDCP data packet of the plurality of PDCP data packets.

14. The method of claim 12, further comprising:
initiating a PDCP data recovery procedure upon expiration of a periodic timer, wherein the PDCP status report is received after initiation of the PDCP data recovery procedure.

15. The method of claim 12, further comprising:
receiving, from a radio resource control (RRC) entity of the transmitter device, a request to perform a PDCP data recovery procedure, wherein the PDCP status report is received after the request to perform the PDCP data recovery procedure is received.

16. The method of claim 15, wherein the request to perform the PDCP data recovery procedure is received in response to the handover of the receiver device from the first base station to the second base station.

17. The method of claim 16, wherein the transmitter device is the first base station.

18. The method of claim 12, wherein the transmitter device receives the PDCP status report after a periodic timer for sending the PDCP status report has expired.

19. The method of claim 12, wherein the PDCP status report includes a sequence number of a first missing PDCP data packet of the plurality of PDCP data packets.

20. The method of claim 12, wherein the PDCP status report includes a bitmap of successfully, unsuccessfully, or both successfully and unsuccessfully received PDCP data packets of the plurality of PDCP data packets.

21. The method of claim 20, further comprising:
discarding, from a PDCP buffer of the PDCP entity, the successfully received PDCP data packets of the plurality of PDCP data packets represented by the PDCP status report.

22. The method of claim 20, further comprising:
storing, in a PDCP buffer of the PDCP entity, the one or more PDCP data packets of the plurality of PDCP data packets that were not successfully received at the receiver device.

23. The method of claim 12, wherein the transmitter device is a base station and the receiver device is a user equipment (UE).

24. The method of claim 12, further comprising:
transmitting a polling bit for the PDCP status report in one of the plurality of PDCP data packets.

25. The method of claim 24, wherein the polling bit is transmitted based on a number of the plurality of PDCP data packets submitted to the RLC entity being greater than a threshold, a total amount of data of the plurality of PDCP data packets submitted to the RLC entity being greater than a threshold, or any combination thereof.

26. The method of claim 12, further comprising:
transmit, to the receiver device, a configuration to release a connection between the receiver device and the first base station.

27. A receiver device comprising:
a memory;
at least one transceiver; and
at least one processor communicatively coupled to the memory and the at least one transceiver, the at least one processor configured to:
receive, at a packet data convergence protocol (PDCP) entity of the receiver device from a radio link control (RLC) entity of the receiver device, a plurality of RLC data packets, the plurality of RLC data packets received from a transmitter device over an RLC unacknowledged mode (UM) data radio bearer (DRB);
generate, by the PDCP entity, a plurality of PDCP data packets corresponding to the plurality of RLC data packets;
receive, via the at least one transceiver, in response to a handover of the receiver device from a first base station to a second base station, an RRC configuration to send a PDCP status report;
cause the at least one transceiver to transmit the PDCP status report to a PDCP entity of the second base station after the handover, the PDCP status report indicating a reception status at the receiver device of the plurality of PDCP data packets; and
receive, via the at least one transceiver, in response to sending the PDCP status report, one or more PDCP data packets of the plurality of PDCP data packets that were not successfully received at the receiver device.

28. The receiver device of claim 27, wherein the at least one processor is further configured to:
receive, from a radio resource control (RRC) entity of the receiver device, a request to send the PDCP status report.

29. The receiver device of claim 28, wherein the request to send the PDCP status report is received in response to initiation of a PDCP recovery procedure at the transmitter device.

30. The receiver device of claim 27, wherein the at least one processor is further configured to:
determine that a periodic timer for sending the PDCP status report has expired.

31. The receiver device of claim 27, wherein the at least one processor is further configured to:
determine that a sequence number of a next PDCP data packet expected to be received is greater than a sequence number of a first PDCP data packet not delivered to an upper layer entity of the receiver device by a length of a reception window, wherein the reception window represents a predetermined number of PDCP data packets.

32. The receiver device of claim 27, wherein the transmitter device is the first base station.

33. The receiver device of claim 27, wherein the PDCP status report includes a sequence number of a first missing PDCP data packet of the plurality of PDCP data packets.

34. The receiver device of claim 27, wherein the PDCP status report includes a bitmap of successfully, unsuccessfully, or both successfully and unsuccessfully received PDCP data packets of the plurality of PDCP data packets.

35. The receiver device of claim 27, wherein the transmitter device is a base station and the receiver device is a user equipment (UE).

36. The receiver device of claim 27, wherein the at least one processor is further configured to:
receive, at the PDCP entity, a polling bit for a PDCP status report in one of the plurality of PDCP data packets.

37. The receiver device of claim 27, wherein the receiver device maintains a connection to the first base station until reception of a configuration from the second base station to release the connection to the first base station.

38. A transmitter device comprising:
a memory;
at least one transceiver; and
at least one processor communicatively coupled to the memory and the at least one transceiver, the at least one processor configured to:
generate, by a radio link control (RLC) entity of the transmitter device, a plurality of RLC data packets corresponding to a plurality of packet data convergence protocol (PDCP) data packets received from a PDCP entity of the transmitter device;
cause the at least one transceiver to transmit, to a receiver device, over an RLC unacknowledged mode (UM) data radio bearer (DRB), the plurality of RLC data packets;
receive, in response to a handover of the receiver device from a first base station to a second base station, the PDCP status report from the receiver device via the at least one transceiver, the PDCP status report indicating a reception status at the receiver device of the plurality of PDCP data packets; and
cause the at least one transceiver to transmit, to the receiver device, based on the PDCP status report, one or more PDCP data packets of the plurality of PDCP data packets that were not successfully received at the receiver device.

39. The transmitter device of claim 38, wherein, based on a PDCP buffer of the PDCP entity being empty, the PDCP entity inserts a polling bit in a last PDCP data packet of the plurality of PDCP data packets.

40. The transmitter device of claim 38, wherein the at least one processor is further configured to:
initiate a PDCP data recovery procedure upon expiration of a periodic timer, wherein the PDCP status report is received after initiation of the PDCP data recovery procedure.

41. The transmitter device of claim 38, wherein the at least one processor is further configured to:
receive, from a radio resource control (RRC) entity of the transmitter device, a request to perform a PDCP data recovery procedure, wherein the PDCP status report is received after the request to perform the PDCP data recovery procedure is received.

42. The transmitter device of claim 41, wherein the request to perform the PDCP data recovery procedure is received in response to the handover of the receiver device from the first base station to the second base station.

43. The transmitter device of claim 42, wherein the transmitter device is the first base station.

44. The transmitter device of claim 38, wherein the transmitter device receives the PDCP status report after a periodic timer for sending the PDCP status report has expired.

45. The transmitter device of claim 38, wherein the PDCP status report includes a sequence number of a first missing PDCP data packet of the plurality of PDCP data packets.

46. The transmitter device of claim 38, wherein the PDCP status report includes a bitmap of successfully, unsuccessfully, or both successfully and unsuccessfully received PDCP data packets of the plurality of PDCP data packets.

47. The transmitter device of claim 46, wherein the at least one processor is further configured to:
discard, from a PDCP buffer of the PDCP entity, the successfully received PDCP data packets of the plurality of PDCP data packets represented by the PDCP status report.

48. The transmitter device of claim 46, wherein the at least one processor is further configured to:
store, in a PDCP buffer of the PDCP entity, the one or more PDCP data packets of the plurality of PDCP data packets that were not successfully received at the receiver device.

49. The transmitter device of claim 38, wherein the transmitter device is a base station and the receiver device is a user equipment (UE).

50. The transmitter device of claim 38, wherein the at least one processor is further configured to:
cause the at least one transceiver to transmit a polling bit for the PDCP status report in one of the plurality of PDCP data packets.

51. The transmitter device of claim 50, wherein the polling bit is transmitted based on a number of the plurality of PDCP data packets submitted to the RLC entity being greater than a threshold, a total amount of data of the plurality of PDCP data packets submitted to the RLC entity being greater than a threshold, or any combination thereof.

52. The transmitter device of claim 38, wherein the at least one processor is further configured to:
cause the at least one transceiver to transmit, to the receiver device, a configuration to release a connection between the receiver device and the first base station.

53. A non-transitory computer-readable medium storing computer-executable instructions that, when executed by a receiver device, cause the receiver device to:
receive, at a packet data convergence protocol (PDCP) entity of the receiver device from a radio link control (RLC) entity of the receiver device, a plurality of RLC data packets, the plurality of RLC data packets received from a transmitter device over an RLC unacknowledged mode (UM) data radio bearer (DRB);
generate, by the PDCP entity, a plurality of PDCP data packets corresponding to the plurality of RLC data packets;
receive, in response to a handover of the receiver device from a first base station to a second base station, an RRC configuration to send a PDCP status report;
transmit the PDCP status report to a PDCP entity of the second base station after the handover, the PDCP status report indicating a reception status at the receiver device of the plurality of PDCP data packets; and
receive, in response to sending the PDCP status report, one or more PDCP data packets of the plurality of PDCP data packets that were not successfully received at the receiver device.

54. A non-transitory computer-readable medium storing computer-executable instructions that, when executed by a transmitter device, cause the receiver device to:
generate, by a radio link control (RLC) entity of the transmitter device, a plurality of RLC data packets corresponding to a plurality of packet data convergence protocol (PDCP) data packets received from a PDCP entity of the transmitter device;

transmit, to a receiver device, over an RLC unacknowledged mode (UM) data radio bearer (DRB), the plurality of RLC data packets;

receive, in response to a handover of the receiver device from a first base station to a second base station, the PDCP status report from the receiver device, the PDCP status report indicating a reception status at the receiver device of the plurality of PDCP data packets; and transmit, to the receiver device, based on the PDCP status report, one or more PDCP data packets of the plurality of PDCP data packets that were not successfully received at the receiver device.

55. A receiver device comprising:

means for receiving, at a packet data convergence protocol (PDCP) entity of the receiver device from a radio link control (RLC) entity of the receiver device, a plurality of RLC data packets, the plurality of RLC data packets received from a transmitter device over an RLC unacknowledged mode (UM) data radio bearer (DRB);

means for generating, by the PDCP entity, a plurality of PDCP data packets corresponding to the plurality of RLC data packets;

means for receiving, in response to a handover of the receiver device from a first base station to a second base station, an RRC configuration to send a PDCP status report;

means for transmitting the PDCP status report to a PDCP entity of the second base station after the handover, the PDCP status report indicating a reception status at the receiver device of the plurality of PDCP data packets; and means for receiving, in response to sending the PDCP status report, one or more PDCP data packets of the plurality of PDCP data packets that were not successfully received at the receiver device.

56. A transmitter device comprising:

means for generating, by a radio link control (RLC) entity of the transmitter device, a plurality of RLC data packets corresponding to a plurality of packet data convergence protocol (PDCP) data packets received from a PDCP entity of the transmitter device;

means for transmitting, to a receiver device, over an RLC unacknowledged mode (UM) data radio bearer (DRB), the plurality of RLC data packets;

means for receiving, in response to a handover of the receiver device from a first base station to a second base station, the PDCP status report from the receiver device, the PDCP status report indicating a reception status at the receiver device of the plurality of PDCP data packets; and means for transmitting, to the receiver device, based on the PDCP status report, one or more PDCP data packets of the plurality of PDCP data packets that were not successfully received at the receiver device.

\* \* \* \* \*